United States Patent [19]

Housel, III et al.

[11] Patent Number: 5,907,678
[45] Date of Patent: May 25, 1999

[54] CLIENT/SERVER SYSTEM IN WHICH PROTOCOL CACHES FOR MULTIPLE SESSIONS ARE SELECTIVELY COPIED INTO A COMMON CHECKPOINT CACHE UPON RECEIVING A CHECKPOINT REQUEST

[75] Inventors: Barron Cornelius Housel, III, Chapel Hill; Ian Beaumont Shields, Raleigh, both of N.C.

[73] Assignee: International Business Machines Corporation, Armonk, N.Y.

[21] Appl. No.: 08/852,585

[22] Filed: May 7, 1997

[51] Int. Cl.[6] .................................................. G06F 15/16
[52] U.S. Cl. ................................ 395/200.43; 395/200.78
[58] Field of Search ........................... 395/200.31, 200.6, 395/200.78, 200.58, 200.59, 200.43, 200.44, 200.34, 200.35, 684

[56] References Cited

U.S. PATENT DOCUMENTS

| | | | |
|---|---|---|---|
| 5,581,704 | 12/1996 | Barbara et al. | 711/141 |
| 5,581,753 | 12/1996 | Terry et al. | 711/141 |
| 5,594,910 | 1/1997 | Filepp et al. | 395/800.28 |
| 5,682,514 | 10/1997 | Yohe et al. | 711/118 |
| 5,706,435 | 1/1998 | Barbara et al. | 711/141 |
| 5,724,581 | 3/1998 | Kozakura | 707/202 |
| 5,734,898 | 3/1998 | He | 707/203 |
| 5,754,774 | 5/1998 | Bittinger et al. | 395/200.33 |
| 5,758,072 | 5/1998 | Filepp et al. | 395/200.5 |
| 5,781,908 | 7/1998 | Williams et al. | 707/104 |
| 5,787,470 | 7/1998 | DeSimone et al. | 711/124 |
| 5,813,032 | 9/1998 | Bhargava et al. | 711/130 |
| 5,832,508 | 11/1998 | Sherman et al. | 707/200 |

Primary Examiner—Zarni Maung
Assistant Examiner—Andrew Caldwell
Attorney, Agent, or Firm—Myers Bigel Sibley & Sajoovec; Jeanine S. Ray-Yarletts

[57] ABSTRACT

Method, apparatus and program products are provided for persistent cache synchronization for a first communication session and a concurrent second communication session over an external communication link between a client protocol conversion application executing on a first computer and a server protocol conversion application executing on a second computer located remote from the first computer. An active cache is established independently for each session with a corresponding cache for each session at the other computer for use with the first and the second communication session respectively. A checkpoint request is transmitted to the server application indicating one of the active protocol caches from either the first session or the second session to be used to provide a checkpoint. On receipt of the request from the server application, the active protocol cache for the indicated session is copied to provide a checkpoint cache of the second computer. Regardless of which session was indicated, the resulting checkpoint cache of the second computer is associated with both the first and the second session. A checkpoint confirmation message is transmitted to the client application with the first computer responsive to the copying operation. On receipt of the checkpoint confirmation message, the client application creates a checkpoint cache of the first computer as a copy of the indicated one of the first or second sessions protocol cache. The checkpoint cache of the first computer is associated with both the first session and the second session to provide a checkpoint. Operations to create new checkpoints are repeated as desired based upon checkpoint criteria.

39 Claims, 6 Drawing Sheets

CLIENT/SERVER SYSTEM IN WHICH PROTOCOL CACHES FOR MULTIPLE SESSIONS ARE SELECTIVELY COPIED INTO A COMMON CHECKPOINT CACHE UPON RECEIVING A CHECKPOINT REQUEST

FIELD OF THE INVENTION

The present invention relates to communications between host applications and terminals. More particularly, the present invention relates to multiple concurrent communication sessions over a low-speed or wireless communication link between a client application at a first computer and a server application at a second computer.

BACKGROUND OF THE INVENTION

Traditional mainframe computer configurations provided for user interface to the computer through computer terminals which were directly connected by wires to ports of the mainframe computer. An example of such a terminal is an IBM 3270 or IBM 5250 type terminal which may communicate with a mainframe (or host) using a Telnet protocol. A Telnet protocol for a terminal such as an IBM 3270 or an IBM 5250 typically provides for structured grouping of data stream transmissions with a series of control characters followed by a block of displayable characters with a data stream comprising a plurality of sequentially transmitted control character blocks followed by displayable character blocks.

As computing technology has evolved, processing power has typically moved from a more central computer model to a distributed environment with local area networks connecting individual work stations to wide area or internet networks linking a number of different local networks through devices such as, for example, routers. Furthermore, due to infrastructure limitations and cost, components of the "network" linking two devices wishing to communicate may include a low through-put component such as a wireless network link. Central mainframe computers continue to play a role in the networked environment. Accordingly, using structured protocols such as the Telnet protocol are still in use. These applications may communicate with users over the network to terminals such as an IBM 3270 or, alternatively, to microprocessor based work stations executing software applications which allow the computers to act as a terminal.

Communications from a terminal (or terminal emulator) to a host are typically disadvantaged particularly on lower through-put network legs, such as wireless legs (or highly congested legs which are effectively bandwidth limited), where bandwidth limitations result in slower response time for communications between the terminal emulators and the host application. In the extreme, protocol timeouts may even cause transmission errors and resulting retransmissions or even inability of the communication system to operate. Thus, utilizing wireless technology, or any low-speed communication technology, with terminal emulator or other structured type data protocols exacerbates the weaknesses of the wireless technology.

A further problem with terminal to host communications relates to session start up. Sessions may be intentionally discontinued and restarted later. Problems may also be encountered where random session failures occur; causing unplanned loss of connection to the host. Additional problems may be encountered with identification of sessions for start up where multiple sessions are active concurrently for a single client/server (terminal/host) pair.

OBJECTS AND SUMMARY OF THE INVENTION

In view of the above limitations, it is one object of the present invention to take advantage of the installed user base of terminal emulator applications and terminals in a low-speed communication environment such as wireless communications.

It is a further object of the present invention to use existing terminal emulator protocols in a low-speed or wireless communication system without requiring modification of the terminal emulator applications.

It is an additional object of the present invention to provide a method of communicating across an external communication link which can reduce the volume of data for transmittal and can thereby increase the performance of the communication system.

It is a further object of the present invention to provide a method of persistent cache synchronization for communications over an external communication link which allows for a reduced volume of data for transmittal and can thereby increase the performance of the communication system after breaks in communication sessions.

It is an additional object of the present invention to provide protocol cache start up synchronization for communications between a client and a server having multiple concurrent communication sessions to reduce the volume of data for transmittal on the network on start-up to thereby increase the performance of the communication system.

In view of these and other objects, the present invention provides methods, systems and computer program products for persistent synchronization for a first communication session and a concurrent second communication session over an external communication link between an application executing on a first computer and an application executing on a second computer located remote from the first computer. In accordance with the present invention, a checkpoint cache is provided for multiple concurrent sessions between a single client/server pair which overcomes the problem of a lack of a unique identifier which can be associated with the checkpoint cache and carried forward in a manner allowing restart of a session regardless of which of the concurrent sessions is being restarted. In particular, according to the present invention, each concurrent session between single client/server pair maintains a separate active protocol cache but all sessions share a common checkpoint cache which is thereby associated with all the sessions rather than any specific individual session. Checkpointing between sessions is courteous, i.e., while any one session is executing a checkpoint, other sessions do not attempt to create a checkpoint to avoid corrupting the shared checkpoint cache. As restarts occur over time, information from prior sessions is merged with information from new sessions. Alternatively, as checkpoints continue to be taken from the various sessions active protocol caches, over time, the checkpoint cache gradually obtains information reflecting traffic for all of the concurrently active sessions thereby providing a beneficial "hot" start up for a new session regardless of which of the concurrent sessions between the client/server pair is restarted.

In one embodiment of the present invention, a method of persistent cache synchronization for multiple concurrent sessions includes establishing a first cache operatively associated with the first session at the first computer and a corresponding second cache operatively associated with the first session at the second computer. A third cache operatively associated with the second session is established at the first computer and a corresponding fourth cache operatively associated with the second session is established at the second computer. A checkpoint request is transmitted to the second computer from the first computer indicating one of the first or the third cache to be used to provide a checkpoint. The checkpoint request is received at the second computer and the second computer copies the second cache responsive to the received checkpoint request if the checkpoint request indicates to the first cache it is to provide a checkpoint cache for the second computer. The fourth cache is copied responsive to the received checkpoint request if the request indicates that the third cache is to provide a checkpoint cache for the second computer. The provided checkpoint cache of the second computer is associated with both the first and the second session.

Responsive to copying a cache to the checkpoint cache of the second computer, a checkpoint confirmation message is transmitted to the first computer. The checkpoint confirmation message is received at the first computer and the first computer creates a checkpoint cache of the first computer as a copy of the indicated one of the first or the third cache responsive to the received checkpoint confirmation message. The checkpoint cache of the first computer is associated with both the first session and the second session to provide a checkpoint. The steps following the establishing steps are repeated when it is determined that a new checkpoint is desired.

In accordance with one embodiment of the present invention, operations for determining when a new checkpoint is desired include initiating a new checkpoint from the first cache based on a checkpoint criteria for the first session and preventing initiating a new checkpoint from the first cache during creation of a checkpoint from the third cache. A new checkpoint is initiated from the third cache based on a checkpoint criteria for the second session and initiating of a new checkpoint from the third cache is prevented during execution of a new checkpoint from the first cache. In another embodiment of the present invention, the checkpoint criteria for the first session is the same as the checkpoint criteria for the second session. In a further embodiment of the present invention, the checkpoint criteria for the first session is a function of the time since the checkpoint was last taken from the first cache and the checkpoint criteria for the second session is a function of the time since the checkpoint was last taken from the third cache. In an additional embodiment of the present invention, the checkpoint criteria for the first session is a function of communications activity associated with the first session and the checkpoint criteria for the second session is a function of communications activity associated with the second session. In a preferred embodiment of the present invention, the checkpoint criteria for the first session and the checkpoint criteria for the second session are selected to result in a checkpoint cache after a plurality of checkpoints have been executed which are taken from both the first cache and the third cache.

In a further embodiment of the present invention, operations related to transmitting a checkpoint confirmation message include determining if a checkpoint cache at the second computer was provided without error and transmitting a checkpoint confirmation message indicating a success if no error is indicated. In a further embodiment, one of the first or third cache at the first computer is copied to a temporary cache of the first computer before transmitting a checkpoint request. Transmitting a checkpoint confirmation message operations further include transmitting a checkpoint confirmation message indicating a failure if an error is indicated in operations providing the checkpoint cache of the second computer. In this embodiment, when the checkpoint confirmation message is received at the first computer, the first computer determines if the received checkpoint confirmation message indicates a success. If a success is indicated, the first computer converts the temporary cache into a checkpoint cache of the first computer. The temporary cache is discarded if the received checkpoint confirmation message indicates a failure.

In a particular embodiment of the present invention, the application executing on the first computer is a client protocol conversion application such as a terminal emulator protocol differencing interceptor, and the application executing on the second computer is a server protocol conversion application such as a terminal emulator protocol differencing interceptor. In this embodiment, the client application preferably determines if a new checkpoint is desired.

In another embodiment of the present invention, operations further include initiating a third communication session by transmitting a request from the client application to the server application over the external communication link. An identification of the checkpoint cache of the second computer is transmitted to the client application responsive to the request. The client application selects a checkpoint cache of the first computer associated with the transmitted identification as a protocol cache operatively associated with the third session at the first computer. An acknowledgment message is then transmitted to the server application acknowledging selection of the identified checkpoint cache as the protocol cache for use with the third session at the first computer. The identified checkpoint cache of the second computer is selected as a corresponding checkpoint cache operatively associated with the third session at the second computer responsive to the acknowledgment message. This provides for utilization of the checkpoint cache created from either or both the first and second sessions for start up of a third session which may be a restart of either the first or the second session. In another embodiment of the present invention, a plurality of checkpoint caches are associated with the second computer and the identifications of each of the checkpoint caches is provided and one, preferably the most recent one, is selected for use in start up.

In another aspect of the present invention, methods, systems, and computer program products are provided for persistent cache synchronization for an application executing on a second computer and having a first communication session and a concurrent second communication session with an application executing on a first computer. The second computer is located remote from the first computer and communicates with the first computer over an external communication link. A protocol cache is established at the second computer for each of the first and the second session. A checkpoint request is received at the second computer identifying one of the first or the second session for a checkpoint. The protocol cache operatively associated with the identified one of the first or the second sessions at the second computer is copied responsive to the received checkpoint request to provide a checkpoint cache of the second computer. A checkpoint cache of the second computer is associated with both the first and second session. A checkpoint confirmation message is transmitted to the first computer confirming copying of the protocol cache. Operations as described subsequent to the establishing step are repeated for additional checkpoints.

In a further aspect of the present invention, methods, systems and computer program products are provided for an application executing on a first computer and having a first communication session and a concurrent second communication sessions with an application executing on a second computer. The first computer is located remote from the second computer and communicates with the second computer over an external communication link. A protocol cache is established operatively associated with the first session at the first computer and a protocol cache is established operatively associated with the second session at the first computer. A checkpoint request is transmitted to the second computer indicating one of the first or the second session whose associated protocol cache is to be used to create a checkpoint. A confirmation message from the second computer is received at the first computer. Responsive to the received confirmation message, a checkpoint cache of the first computer is created as a copy of the protocol cache of the one of the first or the second session at the first computer. The checkpoint cache of the first computer is associated with both the first session and the second session. Operations following the establishing operations may be repeated to provide a new checkpoint.

As will be appreciated by those of skill in this art, the above described aspects of the present invention may also be provided as an apparatus or program product having computer-readable program means. The present invention overcomes the problem of start up synchronization where multiple sessions are allowed between a single client/server pair. This can provide improved performance, particularly, by allowing "hot" start rather than "cold" start for a subsequent new session while still insuring synchronization between the cache utilized at the client and the server side of the communication. Cache checkpointing may also be simplified by copying the entire cache for each checkpoint.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

FIGS. 2–5 are flow chart illustrations of methods and systems according to the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 1:
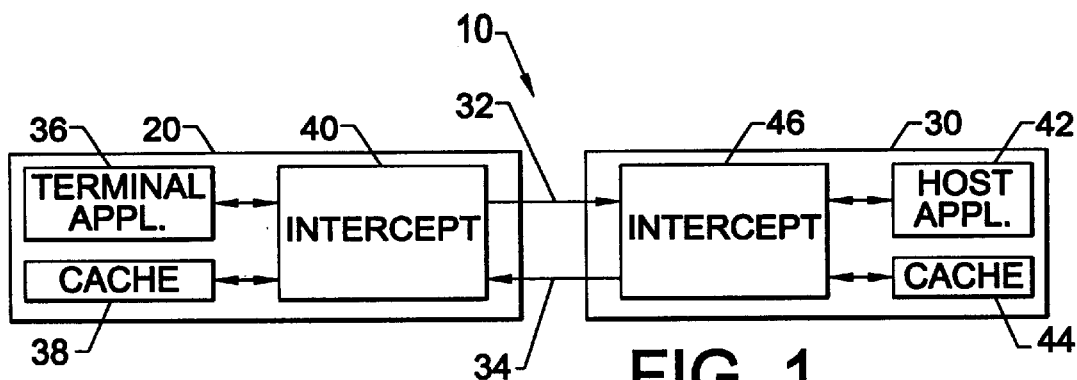
FIG. 1 is a block diagram of a communication system according to one embodiment of the present invention utilizing communication intercept and protocol conversion.

FIG. 1 illustrates an embodiment of the present invention. As seen in FIG. 1, the apparatus 10 of the present invention includes a first computer 20 and a second computer 30 connected over an external communication link 32, 34. As illustrated in FIG. 1, the external communication link includes link 32 for communications from first computer 20 to second computer 30 and link 34 for communications from second computer 30 to first computer 20. While the external communications link 32, 34 may be of any appropriate type, the benefits of the present invention are most notable where external communication link 34 and external communication link 32 include at least one low-speed communication leg such as a wireless external communication link. It is further to be understood that the external communication links 32, 34 will typically be a single physical line or wireless channel carrying two way communications which are separately represented as two simplex lines 32, 34 in FIG. 1. Accordingly, the external communication link between first computer 20 and second computer 30 will generally be referred to herein by reference to number 34.

As illustrated in FIG. 1, first computer 20 includes terminal emulator application 36. Terminal emulator application 36 may be an application level program running on first computer 20 or, alternatively, may be a terminal such as an IBM 3270 rather than an application running on a general purpose computer. Also included on first computer 20 in the illustrated embodiment of FIG. 1 are cache 38 and client protocol intercept (conversion application) 40. Where terminal emulator application 36 is a terminal, cache 38 and interceptor 40 may be incorporated in a separate component rather than resident on the same computer 20 as terminal emulator application 36.

Host application 42 is an application program executing on second computer 30. As illustrated in the embodiment of FIG. 1, second computer 30 further includes cache 44 and server protocol intercept (conversion application) 46. It is to be understood that, while shown as a single computer, second computer 30 may be two or more operatively interconnected computers with the host application 42 operating on a separate system from intercept 46 and cache 44 or any combination of locations for host application 42, cache 44 and intercept 46 so long as all three are operatively interconnected as illustrated in FIG. 1.

Furthermore, while interceptor 40, cache 38, interceptor 46 and cache 44 are illustrated as part of computer 20 and computer 46 respectively, as will be appreciated by those of skill in the art, these components could be separate from computer 20 and computer 40. Such an embodiment of the present invention would be particularly useful where communication links 32, 34 comprise multiple links of differencing performance. In such a case the interceptor and cache components may be located on either side of the low-speed portion of the communication links so as to carry out the operations of the present invention for the low-speed portion of the communication links while the remaining links are operated utilizing a conventional data stream.

As used herein, the term "cache" refers to a storage device such as, for example, RAM, EEPROM, DRAM, shift registers or other storage means such as are known to those of ordinary skill in this art. As will further be appreciated by one of skill in the art, cache 38 and cache 44 may also be implemented with mass storage such as hard disk, read/write CD-ROMs, optical disk, or other storage technologies.

As used herein, the term "terminal emulator application" refers to applications resident on computers or stand-alone terminals such as an IBM 3270 or other devices which communicate over external communication links utilizing a terminal emulation protocol.

As used herein, the term "terminal emulation protocol" refers to a protocol used for communications between two applications or devices which includes structured and segmentable groupings of data and further includes some amount of recurring data being communicated between the applications. A typical example of a terminal emulator protocol is a terminal communication protocol such as Telnet 3270 which is utilized for communications between IBM 3270 terminal (or terminal emulation) devices and a host. The Telnet protocol typically comprises a series of control characters followed by displayable characters with each sequential grouping of displayable characters being associated in some manner with the preceding block of control characters. It is further to be understood that the terminal emulator protocol does not define the communications protocol for all levels of communication. For example, the communications may pass over a TCP/IP type network wherein the TCP and IP layers impose further communications protocol rules on the communication. However, for purposes of disclosing the present invention, the lower layer of protocols will not be considered or discussed.

Terminal emulator application 36 and host application 42 communicate over external communication link 34 using a terminal emulation protocol. Communications may proceed continuously or intermittently during a session between terminal emulator application 36 and host application 42 and sessions may terminate and later restart between a given terminal emulator application 36 and a host application 42. In operation, host application 42 typically outputs a terminal emulator protocol data stream which is intercepted by host side protocol interceptor 46 or other means for intercepting the terminal emulator protocol data stream from the host application prior to transmission on external communication link 34. Host protocol interceptor 46 then converts or transforms the terminal emulator protocol data stream to a differenced communication protocol data stream. The differenced communication protocol data stream includes a reduced volume of data for transmittal compared to the corresponding terminal emulator protocol data stream. This reduction is accomplished because the differenced communication protocol data stream is based on recognition and replacement of data segments which have previously been transmitted by host application 42. Protocol interceptor 46 then transmits (for example, by providing the differenced communication protocol data stream to a TCP/IP stack of second computer 30) the differenced communication protocol data stream over external communication link 34.

The terminal emulator application side protocol interceptor 40 receives the transmitted differenced communication protocol data stream at first computer 20. This may be accomplished, for example, by binding interceptor 40 to a TCP/IP stack on first computer 20. Terminal emulator protocol interceptor 40 reconstructs the original terminal emulator protocol data stream from the received differenced communication data stream and provides the reconstructed terminal emulator protocol data stream to terminal emulator application 36.

Accordingly, host application 42 and terminal emulator application 36 only need operate using the terminal emulation protocol as the differenced communication protocol data stream is transparent to both host application 42 and terminal application 36. As will be described more fully in connection with the flow charts describing operation according to the present invention, cache 38 on first computer 20 and cache 44 on second computer 30 are operatively connected and utilized by protocol interceptors 40, 46 in converting and reconstructing the terminal emulator protocol data stream.

As described above, in one embodiment of the present invention, external communication link 34 is a wireless communication link. In such a case, in order to obtain system performance which is acceptable to users, it is desirable to reduce the amount of communication over external communication link 34 by reducing the amount of information which must be transferred over communication link 34. Accordingly, the present invention utilizes protocol reduction techniques involving segmenting and caching to provide a unique type of differencing to thereby minimize the amount of communication required over external communication link 34. While referred to herein as protocol reduction, as will be described herein, the techniques of the present invention could likewise be referred to as data reduction as the differencing methods of the present invention reduce the volume of data for transmission over the external communication link 34.

While operations of the present invention will be described primarily with respect to a single terminal emulator application and a single host application operating on a single session, as will be appreciated by those of skill in the art and will be described more fully herein, the benefits and advantages of the present invention may also be achieved with multiple terminal emulator applications 36 associated with multiple host applications 42 across various sessions separated in time. Thus, the methods, apparatus and program products of the present invention may be applied to a plurality of communications over a plurality of sessions.

As will be appreciated by one of skill in the art, the cache 38 resident in the first computer or cache 44 resident on the second computer may be of any size based upon the specific hardware configurations of the computers. These caches store information related to the communications and in one embodiment, in particular, store a unique identifier based on the communications content such as a cyclical redundancy check (CRC) of a segment of the data communication but, as will be described herein, respective caches 38, 44 may also provide a unique indicator associated with a stored transmit segment for a corresponding received segment or may store the contents of the segment itself. A directory of cache entries may be created for each communication stored in the cache. Furthermore, because of the limited resources available in any given hardware configuration, any number of caching techniques known to one of skill in the art for maintaining the caches resident in the first computer and the second computer may be utilized. Thus, for example, the cache may invalidate the oldest directory entry if a user-defined cache size would be exceeded by the addition of a new entry and then the new entry may be added in place of the invalidated entry. Furthermore, cache entries may be maintained over multiple sessions or even power on cycles of the first or second computers to create a persistent cache as will be described more fully later herein.

Operations for the host application side of a communication for one embodiment of the present invention will now be described with reference to FIGS. 2 and 3. More particularly, FIGS. 2 and 3 are flow charts describing the operations of the host application side protocol interceptor 46 (FIG. 2) and the terminal emulator application side protocol interceptor 40 (FIG. 3).

Figure 2:
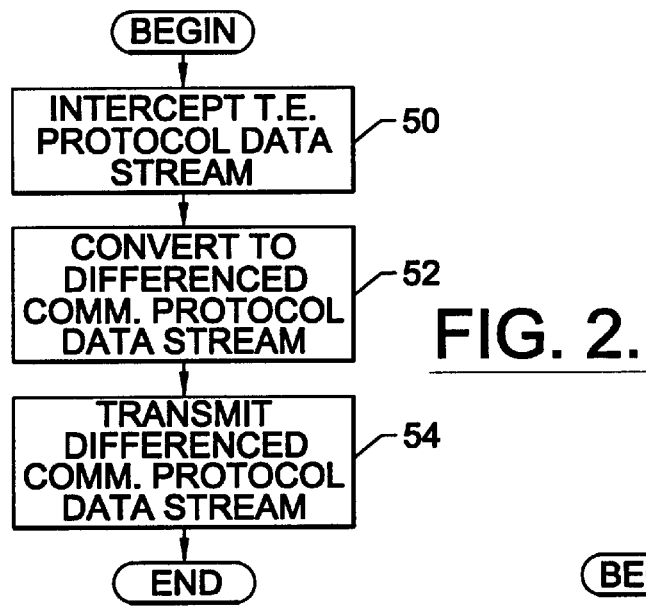
FIG. 2 is a flow diagram depicting operations carried out by a host application side protocol interceptor according to an embodiment of the present invention.

With reference to FIG. 2, at block 50 protocol interceptor 46 intercepts a terminal emulator protocol data stream from host application 42 which is addressed to terminal emulator application 36 prior to transmission of the terminal emulator protocol data stream on external communication link 34. The intercepted terminal emulator protocol data stream originated by the host application 42 is converted to a differenced communication protocol data stream at block 52. The differenced communication protocol data stream includes a reduced volume of data for transmittal over external communication link 34 compared to the corresponding terminal emulator protocol data stream. The reduction in volume of the differenced communication data stream is based on recognition and replacement of data segments which have previously been transmitted by host application 42. At block 54 the differenced communication protocol data stream from block 52 is transmitted to second computer 20 over external communication link 34.

Figure 3:
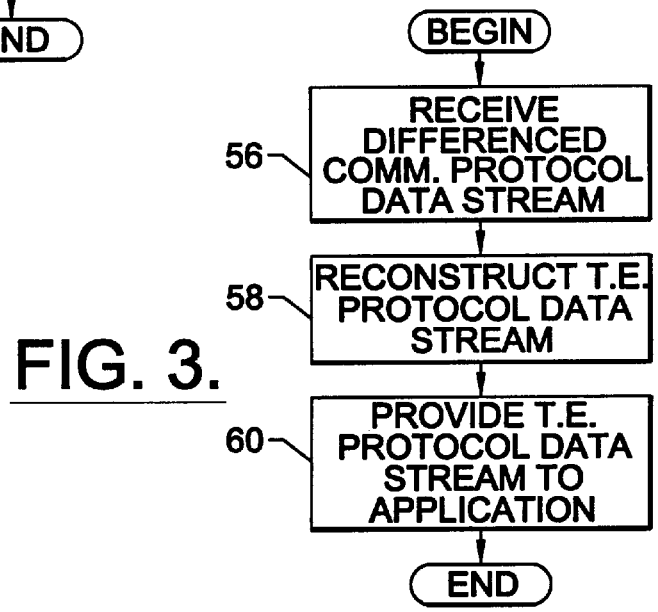
FIG. 3 is a flow diagram depicting operations carried out by a terminal emulation application side protocol interceptor according to an embodiment of the present invention.

Referring now to FIG. 3, operations of an embodiment of the present invention with respect to the terminal emulator application side protocol interceptor 40 will now be described. At block 56 the transmitted difference communication protocol data stream from protocol interceptor 46 is received by protocol interceptor 40 at first computer 20. The terminal emulator protocol data stream originally generated by host application 42 is reconstructed from the received differenced communication protocol data stream at block 58. The reconstructed terminal emulator protocol data stream is provided to terminal emulator application 36 at block 60.

Figure 4:
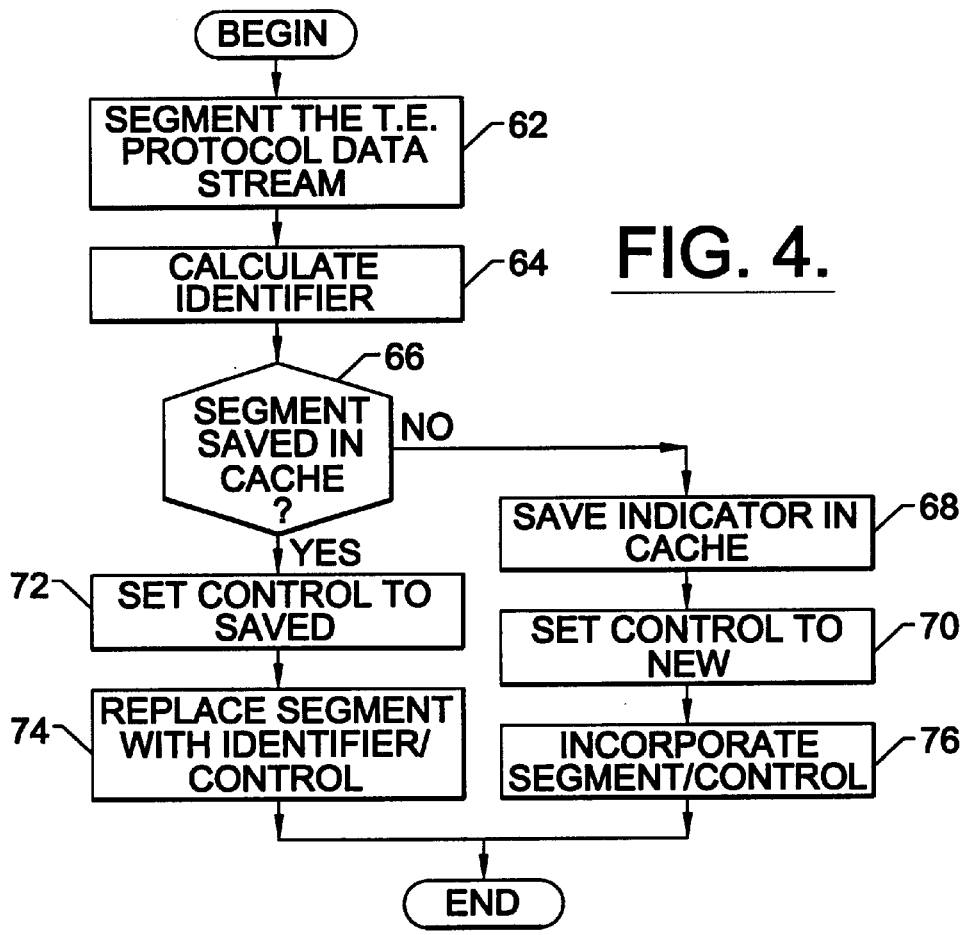
FIG. 4 is a flow diagram depicting operations for the conversion step for host application side operations of an embodiment of the present invention utilizing a cache.

The operations related to converting the terminal emulator protocol data stream originated by the host application to a differenced communication protocol data stream will now be described for an embodiment of the present invention utilizing a cache by reference to FIG. 4. At block 62, the terminal emulator protocol data stream from host application 42 is segmented into transmit segments. The segmenting or chunking of the terminal emulation protocol data stream into meaningful parts provides for a reduction in data to be transmitted despite the continuous nature of the typical terminal emulator protocol data stream. The data stream from host application 42 is segmented into meaningful parts that can be identified and stored in a cache and subsequently "matched" to future data stream sequences such as screens or parts of screens.

At block 64 an identifier is calculated for a transmit segment. In one embodiment of the present invention, the identifier is calculated from the contents of the transmit segment using a cyclical redundancy code to provide a cyclical redundancy check value as an identifier. A sufficient number of bits may be provided for the cyclical redundancy check value to minimize the potential for two distinct data segments having an identical identifier.

At block 66, host application side protocol interceptor 46 determines if the transmit segment corresponds to a segment saved in the cache 38 residing on first computer 20. This function is provided by operatively connecting protocol interceptor 46 to cache 38 by, for example, synchronizing cache 44 to cache 38. The synchronization may be provided by saving corresponding segments or indicators of segments in each of cache 44 and cache 38. Furthermore, in the case where hardware limits may result in overflow of cache 38 or cache 44, the aging and segment replacement logic applied to both cache 38 and cache 44 is preferably compatible to insure that for each indicator saved in cache 44, the corresponding terminal emulation protocol data stream segment exists in cache 38.

If the transmit segment does not correspond to a segment saved in the cache 38 residing on first computer 20, an indicator associated with that transmit segment is stored in cache 44 residing on second computer 30 at block 68 and a control field is associated with the transmit segment and set to indicate a new segment at block 70. In the illustrated embodiment, a protocol cache update counter is incremented each time a new indicator is stored in cache 44. The protocol cache update counter is synchronized with a corresponding protocol cache update counter maintained at first computer 20 which is incremented when cache 44 has a new entry stored. If the transmit segment does correspond to a segment saved in cache 38, a control field is associated with the transmit segment and set to indicate a save segment at block 72. At block 74, the identifier calculated for the transmit segment from the terminal emulator protocol data stream replaces the transmit segment in the differenced communication protocol data stream to thereby provide a differenced communication protocol data stream.

In contrast, if the transmit segment is determined to be a new segment at block 66, the transmit segment itself rather than the identifier is included in the corresponding position in the differenced communication protocol data stream at block 76. At block 76 and at block 74 the control field is also incorporated in the differenced communication protocol data stream.

In one embodiment of the present invention, the indicator saved at block 68 is the same value, for example, the CRC, as that calculated as the identifier at block 64. In an alternative embodiment, the indicator is the transmit segment in which case cache 44 and cache 38 would both include stored therein the various transmit segments.

In a further embodiment of the present invention, a CRC is calculated for the transmit segment and when a new segment is saved (block 68) the CRC is associated in a cache index file with a segment or block address number which associates the CRC with the cache location where the corresponding segment is stored. The segment or block address number is used as the identifier for future transmissions allowing a direct pointer to the corresponding cache location in cache 38 so long as the segment or block address numbers are synchronized between caches 38 and 44.

Figure 5:
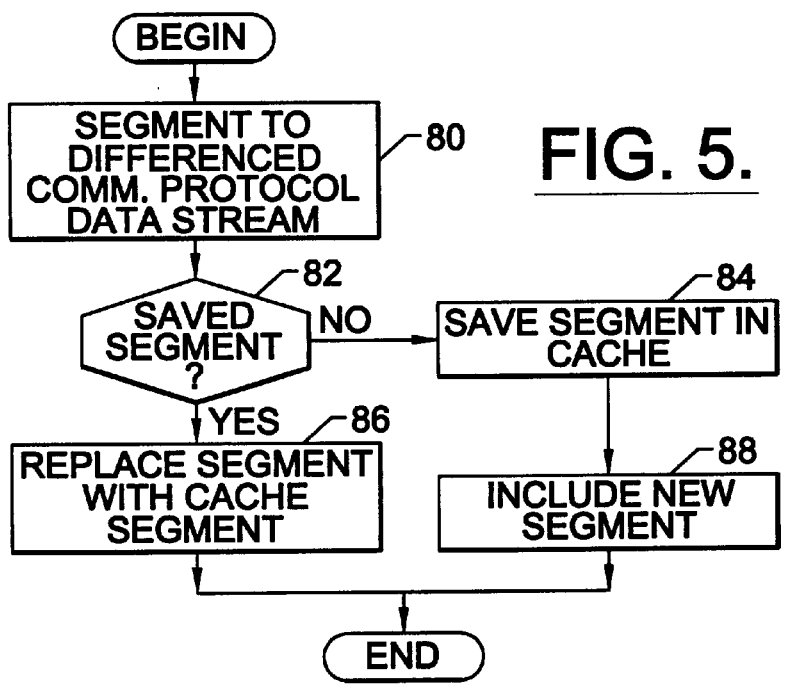
FIG. 5 is a flow diagram depicting operations for the reconstructing step for terminal emulator application side operations of an embodiment of the present invention utilizing a cache.

Referring now to FIG. 5, operations for the reconstructing block at block 58 of FIG. 3 will be described with further detail for an embodiment of the present invention. At block 80, the transmitted differenced communication protocol data stream received at first computer 20 is segmented by protocol interceptor 40 into segments corresponding to the segments of the terminal emulator protocol data stream from host application 42 as described with respect to block 62 for FIG. 4. At block 82, protocol interceptor 40 determines if the received segment corresponds to a segment saved in cache 38 residing on first computer 20. In one embodiment of the present invention, protocol interceptor 40 determines if the received segment corresponds to a saved segment by determining if the control field for the segment, which corresponds to the control field for the corresponding transmit segment as described at blocks 70–76 of FIG. 4, indicates a new segment or a saved segment.

If the received segment does not correspond to a segment saved in cache 38, at block 84, the new segment is saved in cache 38. If the received segment is determined at block 82 to correspond to a segment saved in cache 38, the received segment will, as was described in connection with block 74 of FIG. 4, contain an identifier rather than a corresponding segment from the host application. At block 86, the identifier is replaced with the corresponding saved segment from cache 38 which corresponds to the identifier of the transmit segment which was received in lieu of the data segment itself. The terminal emulator protocol data stream originally provided by host application 42 is thereby reconstructed by inserting the data segments in place of the identifiers which were used to minimize the amount of data transmitted over external communication link 34.

If the received segment was a new transmit segment, in which case the received segment includes the data stream segment rather than the identifier, (as described at block 76 of FIG. 4), the received segment is included in the reconstructed terminal emulation protocol data stream at block 88. In an embodiment of the present invention utilizing a control field indicating a new or saved segment, as described in connection with block 70 and 72 of FIG. 4, the control field is removed from the segment before inclusion in the reconstructed terminal emulation protocol data stream at blocks 86 and 88, respectively.

While the operations of the present invention have been described in connection with FIGS. 2–5 solely with respect to communications from host application 42 to terminal emulator application 36 over external communication link 34, it is to be understood that communications from terminal emulator application 36 to host application 42 over external communication link 32 may also be operated on in accordance with the teachings of the present invention. The communication flow from terminal emulator application 36 may be intercepted by protocol interceptor 40 prior to transmission over external communication link 32 and a control field added to the terminal emulator protocol data stream containing information related to cache synchronization or other information useful for coordinating operations of protocol interceptor 40 and protocol interceptor 46. The terminal emulator protocol data stream, including the control field, may then be transmitted from protocol interceptor 40 to protocol interceptor 46. The control field is removed from the terminal emulator protocol data stream by protocol interceptor 46 before passing the stream on to host application 42. Examples of the use of this embodiment of the invention in which the return data stream has a control field added without differencing the data stream itself will be described subsequently in connection with the persistent cache aspects of the present invention.

While terminal emulator protocol data streams from terminal emulator 36 to host application 42 typically include smaller quantities and less repeating patterns in the data stream than the flows from host application 42 and therefore may not benefit as much from the differencing methods of the present invention, it is to be understood that the methods of the present invention may in any event be applied to both directions of data flow in the same manner as has been described previously for flows from host application 42 to terminal emulator application 36. It is to be further understood that the operations or flows from the terminal emulation application 36 to host application 42 would be described in the same manner as was used in FIGS. 2–5 except for the swapping of references to components resident on first computer 20 and second computer 30 respectively to reflect the reverse direction of the communication.

To further illustrate the operations of the present invention, operations for a particular embodiment of the present invention applied to a Telnet terminal emulator protocol will now be described. Protocol interceptor 46 receives a Telnet data stream from host application 42 until a Telnet "end of record" is reached. If traditional data compression is used on the data stream in addition to the present invention, the data buffer is preferably decompressed before any other processing occurs according to the present invention. Protocol interceptor 46 chunks or segments the data stream by parsing the specific data stream (e.g., 3270 or 5250). This is done by scanning the data stream for data and terminating the scan when a non-data element is detected (for example, a set buffer address order). If the control bytes plus the data bytes are greater than a specified minimum (for example, 16 bytes), a segment is identified. This minimum size check prevents very small segments from being replaced by an identifier which may increase relatively the quantity of data to be transmitted. The scanning approach in this embodiment is somewhat analogous to scanning text for end-of-line characters. Segment scanning in this embodiment does not span 3270 or 5250 "commands."

For one embodiment of the present invention, a cyclical redundancy check (CRC) is computed for the scanned segment. The CRC is used as the key for accessing the segment cache 44. The cache is then resolved. Resolving the cache comprises searching cache 44 for the segment using the computed CRC key. If the segment is found, its cache address is returned. Otherwise, the segment is written to cache 44. Other ways of mapping a segment of data to an identifier could also be beneficially used with the present invention as will be understood by those of ordinary skill in the art.

Optionally, traditional data compression techniques (for example, LZ arithmetic encoding) may be applied to the differenced communication protocol data stream to further reduce data volume for transmission over external communication link 34 so long as a corresponding data decompression interface is provided at first computer 20.

If the segment does exist (or is indicated as existing) in cache 44, an encoded unit consisting of an ID or control field in the segment's cache address is written to the output stream and transmitted over external communication link 34. If the segment was not found in cache 44 an encoded unit is constructed consisting of an identifier control field and a length field followed by the segment. In either case, the encoded unit is transmitted over external communication link 34 as part of the differenced communication protocol data stream.

At the terminal emulator application computer 20 side, the differenced communication protocol data stream is read until a Telnet "end of record" is detected. Protocol interceptor 40 then scans the encoded units and if the identifier indicates a cache address, it reads the corresponding segment from cache 38. If the identifier indicates new segment data, then the encoded header, including the identifier and length fields, is stripped off and a segment CRC is computed. The segment is then written to the segment cache 38 using the CRC as a key to segment cache 38. Alternatively, as the CRC had been computed by protocol interceptor 46, the CRC may have been included in the encoded header in which case it could be read rather than computed by protocol interceptor 40. However, as the CRC may be defined to include a large number of bits to insure unique identification of data streams, transmission of the CRC may increase the volume of the transmitted data stream which is intended to be reduced. The new segment is then saved in cache 38. The segment data is included in the terminal emulator (Telnet) data stream to terminal emulator application 36.

The above steps are repeated continuously for all data sent from host application 42 to terminal application 36 until a session is terminated. Furthermore, it will be appreciated by one of skill in the art that protocol interceptor 40 and protocol interceptor 46 may be implemented through software, hardware or a combination thereof.

While reference has been made to caches being resident in a particular first or second computer, as will be appreciated by one of skill in the art, the benefits of the present invention may be achieved even though the cache is not resident in the computer but is simply on the same side of the external communication link as the computer. Thus, a hardware cache could be implemented external to first computer 20 that serves as a terminal emulator application cache 38 and which is connected to first computer 20 by a high speed communications link. As long as the cache is on the same side of external communication link 34 as first computer 20, the benefits of the present invention will be achieved. Likewise, the same is true for cache 44 of host application side computer 30.

While methods of operation related to maintenance of cache 38 and cache 44 when the caches are of a finite size which, relative to the number of different segments communicated, may overflow have not been described herein, methods for handling removal of old cache entries to create space for new cache entries are known to those of ordinary skill in the art and need not be described herein. For example, a first-in, first out aging method could be utilized.

Persistent Cache and Session Start Up

The differencing system of the present invention, as described above, provides client and server protocol caches which are automatically synchronized as long as the data is transferred correctly and the two ends use the same algorithms for updating the protocol caches. In the event that a connection is lost, either accidentally or at the request of the user, the user will typically benefit by being able to use the protocol cache from the previous session rather than having to start with no cache on a new session (sometimes referred to as a "cold" start). In order to obtain the benefits of starting a session with a previously established protocol cache (i.e., a persistent cache), the present invention provides checkpoint methods (as well as apparatus and computer program products) to insure that a recent copy of the protocol cache will be available to both the client (i.e., the client protocol intercept 40) and the server (i.e., the server protocol intercept 46) when a new session starts (or an interrupted session restarts). The checkpoint methods of the present invention can provide checkpoint synchronization without blocking continued activity on the current session. The checkpoint methods of the present invention can further minimize the cost in terms of cycles and additional protocol overhead associated with the checkpoint procedures.

Figure 6:
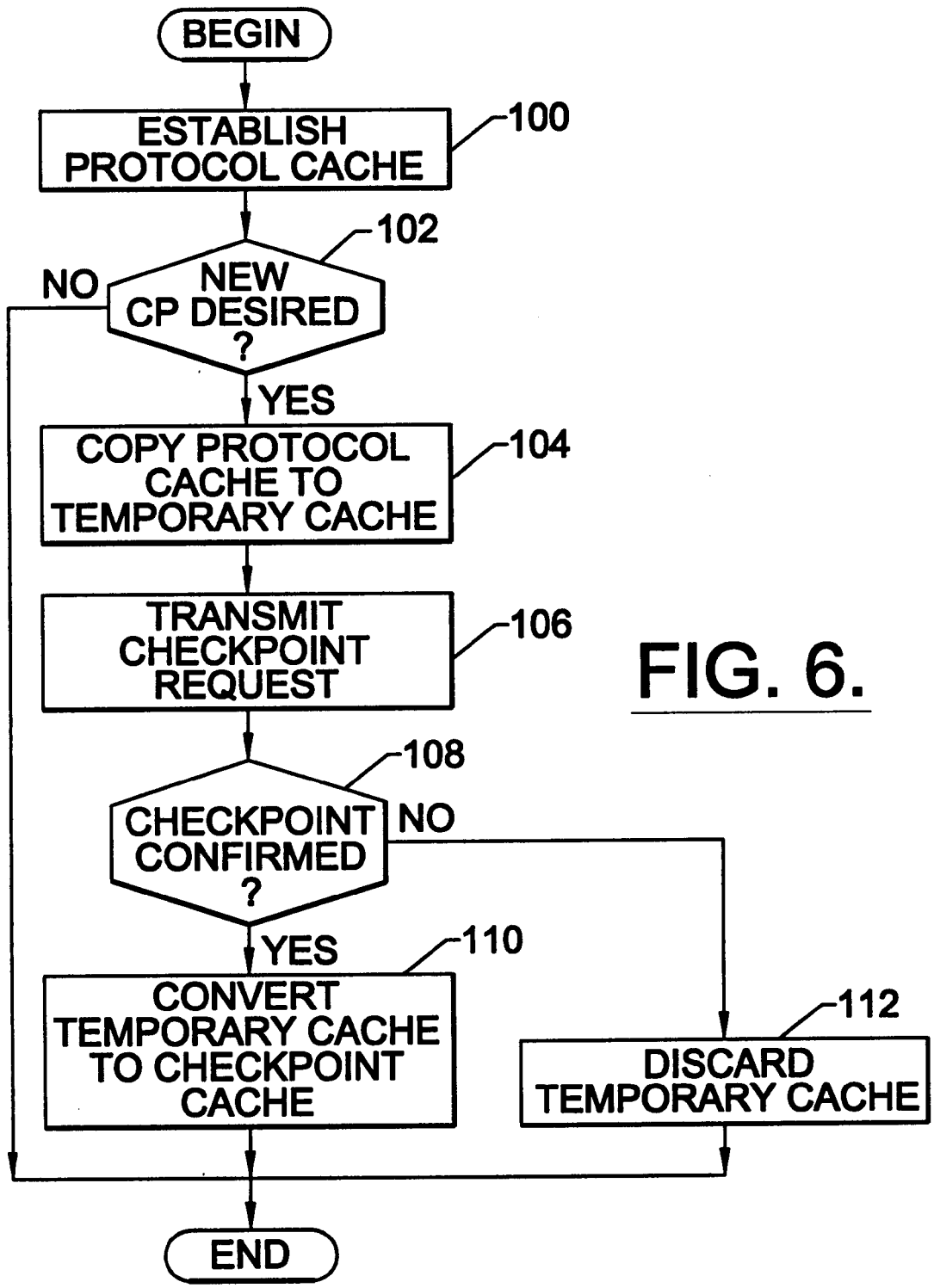
FIG. 6 is a flow diagram depicting operations carried out in generating a checkpoint cache for the first computer side of a communication session according to an embodiment of the present invention.
Figure 7:
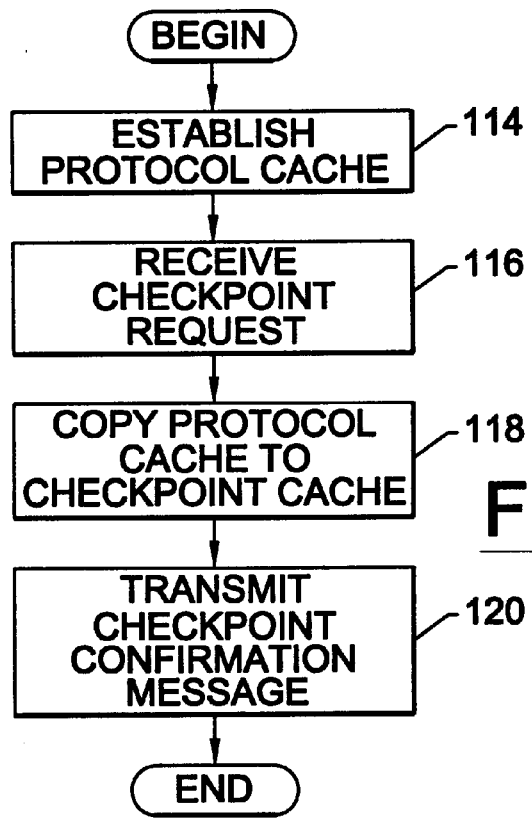
FIG. 7 is a flow diagram depicting operations carried out in generating a checkpoint cache for the corresponding second computer side of a communication session according to an embodiment of the present invention.

Checkpoint methods, apparatus and program products according to the present invention will now be described with reference to FIGS. 6–10. FIG. 6 illustrates operations for generating a checkpoint according to an embodiment of the present invention from the perspective of first computer 20. FIG. 7 illustrates corresponding operations for generating a checkpoint from the perspective of the second computer 30.

Referring now to FIGS. 1 and 6, operations for the client protocol conversion application 40 executing on the first computer providing persistent cache synchronization according to one embodiment of the present invention will now be described. At block 100, a protocol cache 38 operatively associated with first computer 20 is established. The protocol cache 38 operatively associated with the first computer is utilized by the protocol conversion application 40 executing on the first computer 20 to improve the performance of communications over the external communications link 34 as described previously in connection with the terminal emulator data stream differencing aspects of the present invention. At block 102, the protocol conversion application 40 executing on the first computer 20 determines if a new checkpoint is desired. At block 104, if a new checkpoint is desired, the protocol cache 38 of the first computer is copied to a temporary cache. A checkpoint request is transmitted to the second computer 30 at block 106. To insure synchronization of the protocol caches used for the checkpoint, the checkpoint request includes the value of the protocol cache update counter from the first computer. The operations of the second computer 30 responsive to the checkpoint request transmitted at block 106 will be discussed in connection with FIG. 7.

At block 108, a checkpoint confirmation message is received at the first computer 20. The checkpoint confirmation message may indicate either a success or a failure depending upon whether the operations for the second computer 30, which will be discussed in connection with FIG. 7, were executed successfully. If the received checkpoint confirmation message at block 108 indicates a success, at block 110 the temporary cache is converted into a checkpoint cache of the first computer. Otherwise, the temporary cache is discarded at block 112 as a failure was encountered.

While for embodiment described in connection with FIG. 6, the checkpoint cache on the first computer 20 is provided by first copying the protocol cache 38 to a temporary cache at block 104 and then, after receipt of a confirmation message from the second computer 30, converting the temporary cache to a checkpoint cache at block 110, it is to be understood that a different sequence may be used while still obtaining the benefits of the present invention by creating a checkpoint cache of the first computer as a copy of the protocol cache 38 responsive to a received checkpoint confirmation message. For example, operations at block 104 of copying to a temporary cache could be left out and operations at block 110 would then involve converting the protocol cache 38 to the checkpoint cache at block 110 after receipt of the checkpoint confirmation message. Either of these approaches or other approaches may be utilized in accordance with the present invention so long as synchronization is maintained to insure that the checkpoint cache created at each of the first computer and the second computer provide corresponding caches which will be usable for communication at session start up.

The operations related to establishing a persistent cache checkpoint according to an embodiment of the present invention from the perspective of server protocol conversion application 46 of second computer 30 will now be described with reference to FIGS. 1 and 7. At block 114, a protocol cache 44 operatively associated with the second computer is established. The protocol cache 44 operatively associated with the second computer 30 corresponds to the protocol cache 38 operatively associated with the first computer 20 for a given communication session between the first computer 20 and the second computer 30 over the external communication link 34. At block 116 a checkpoint request is received from the second computer 30. In the illustrated embodiment, the protocol cache update counter from the first computer is read from the checkpoint request and compared to the current protocol cache update counter of the second computer to insure that the active cache matches the cache copied to a temporary file at the first computer. Responsive to the checkpoint request, the protocol cache 44 of the second computer 30 is copied to provide a checkpoint cache of the second computer 30. At block 120, the second computer 30 transmits a checkpoint confirmation message to the first computer 20 responsive to the copying operations of block 118. Preferably, two checkpoint caches are maintained at second computer 30 to provide for the possibility of the checkpoint confirmation message not being received at first computer 20.

Operations as described for blocks 102 through 112 of FIG. 6, along with the corresponding operations at blocks 116 through 120 of FIG. 7 result in providing a checkpoint for the communication session with corresponding protocol caches 38, 44 available at both the first computer 20 and the second computer 30 for use on restart if the session is interrupted. These checkpoint generating operations are preferably repeated periodically as will be described further in connection with FIG. 10.

In one embodiment of the present invention, operations related to transmitting the checkpoint confirmation messages at block 120 include determining if the checkpoint cache of the second computer was provided without error by the copying operations at block 118. A checkpoint confirmation message is then transmitted indicating a success if no error was encountered in providing the checkpoint cache of the second computer 30. If an error is encountered, the checkpoint confirmation message indicating a failure is transmitted at block 120. A mismatch between the protocol cache update counter received with the checkpoint request from the first computer and the current protocol cache update counter of the second computer will be treated as an error resulting in a failure indication in the checkpoint confirmation message.

Figure 8:
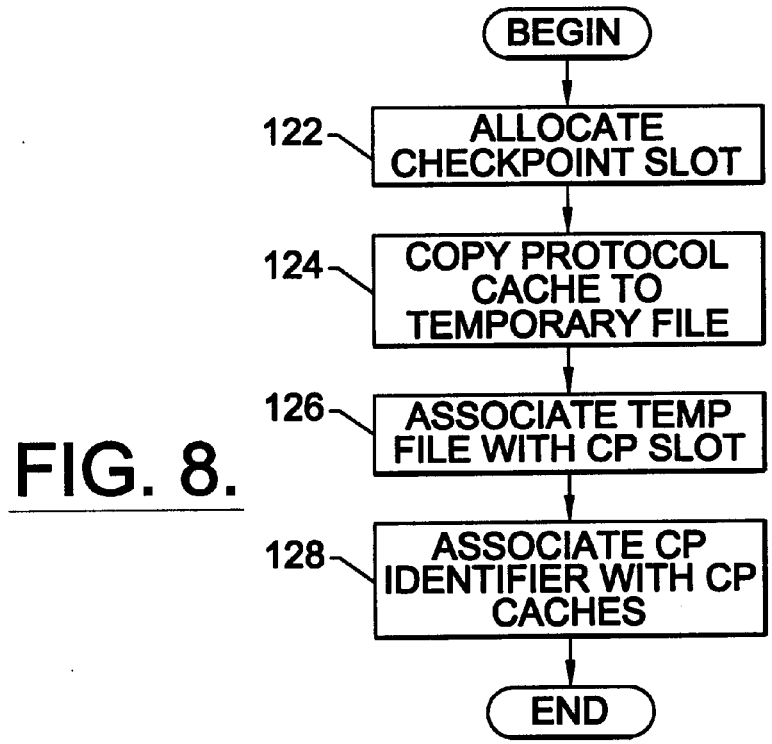
FIG. 8 is a flow diagram depicting operations for copying an active protocol cache to a checkpoint cache according to an embodiment of the present invention.

Operations related to copying a protocol cache to provide a checkpoint cache at the second computer (block 118) will now be further described for one embodiment of the present invention with reference to FIG. 8. At block 122, a checkpoint slot is allocated associated with second computer 30. A maximum number of checkpoint slots may be allocated at the second computer 30. In this case, the checkpoint slots are reused, preferably so that the oldest checkpoints are deleted as new checkpoints are created. For the embodiment illustrated in FIG. 8, the cache either on the first computer 20 or the second computer 30, whether the active protocol cache 38, 44 or a checkpoint cache, includes an index file and a data file. At block 124, protocol cache 44 is copied to a temporary file. For memory utilization, the active cache files may be flushed to a disk and the new checkpoint cache created by copying the active files to new checkpoint files. Having selected the next checkpoint slot, for example, by a cyclical rotation through the allocated slots at block 122, a checkpoint identifier number is established at block 124 for association with the checkpoint, preferably by monotonically increasing a persistent number (such as a 31 bit integer) that is increased each time a checkpoint is taken. A checkpoint identifier thereby becomes a unique identifier for the checkpoint associated with the new checkpoint cache being created at the second computer in the operations illustrated in FIG. 8. The temporary checkpoint files from block 124 are made permanent at block 126 by associating or tagging them with the assigned checkpoint slot number. At block 128, the checkpoint identifier is associated with the checkpoint cache of the second computer. In the illustrated embodiment, this is accomplished by updating a checkpoint control file to record the new checkpoint by the checkpoint identifier linked to the checkpoint slot containing the corresponding checkpoint cache.

For the embodiment of the present invention described in connection with FIG. 8, wherein a checkpoint identifier is associated with the checkpoint cache of the second computer, the transmitting checkpoint confirmation operations (block 120) optionally include transmitting the checkpoint identifier number as part of the checkpoint confirmation message. Alternatively, the same rules for generating the checkpoint identifier number may be maintained at both the first computer 20 and the second computer 30 to insure the checkpoint identifier numbers maintain synchronization during an active communication session.

A failure indication may be caused to be returned as the checkpoint confirmation message if checkpointing operations at the second computer 30 are interrupted. For example, an urgent message may have been transmitted from host application 42 causing the protocol cache 44 of the second computer 30 to contain more recent data than the protocol cache 38 of the first computer 20 did at the time the checkpoint was initiated by the first computer 20. While such communication session traffic failures may result in out of synchronization conditions, this does not affect operations of the checkpoint methods to provide persistent cache according to the present invention, as only confirmed and committed checkpoint files are set up as checkpoint caches (blocks 110, 112) which may be used in session start up or restart. Checkpoint caches are synchronized because the active protocol cache file copy will have occurred at the same point in the data stream in both the first computer 20 and the second computer 30.

In accordance with the present invention, either the client application 40 or the server application 46 may determine that a checkpoint is required and initiate the checkpoint (block 102). Preferably, the client protocol conversion application 40 initiates the checkpoint. Client initiation is preferred as terminal data flows are frequently characterized by data entered by the user or terminal application 36 being transmitted to host application 42 and a response being returned from host application 42 almost immediately. User or terminal application 36 will then typically delay some amount of "think time" before entering the next request for transmission.

In one embodiment of the present invention, protocol cache 38 of the first computer 20 includes a cache index file and a cache data file. In this embodiment, operations at block 104 of FIG. 6 include flushing both the cache index file and data file to disk. Client protocol conversion application 40 then copies the index and data files to temporary checkpoint files. The cache files are small enough (typically approximately 1 MB) that these files will not be perceptible to the end user. Having created the temporary files, client protocol conversion application 40 of the first computer 20 is able to commit to the creation of a new checkpoint. In this embodiment, the transmit checkpoint request operations at block 106 include inserting the checkpoint request into the data stream as a special type of encoding unit. In an embodiment of the present invention utilizing the checkpoint indicator as described previously, the checkpoint cache of the first computer is identified at block 110 with the same checkpoint number as a corresponding checkpoint cache of the second computer.

Figure 9:
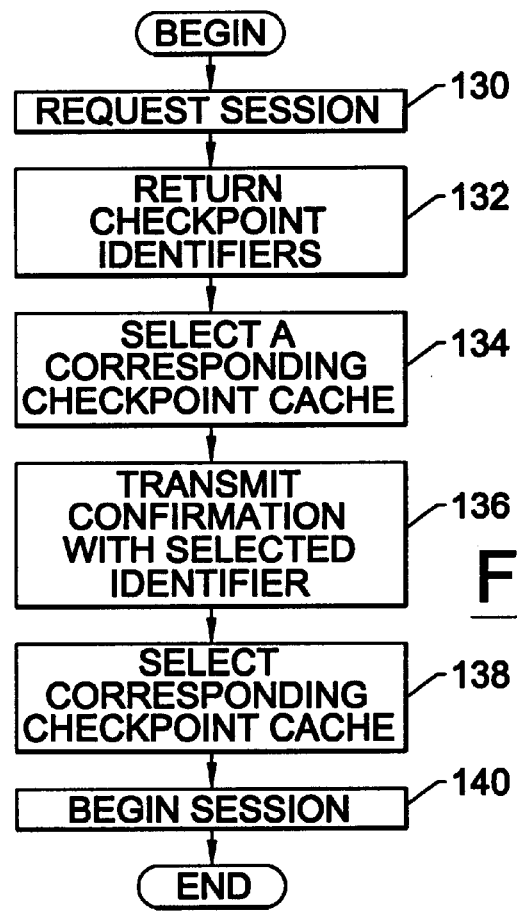
FIG. 9 is a flow diagram depicting start up operations for a new session utilizing a checkpoint cache to initialize the active protocol cache for the communication session according to an embodiment of the present invention.

Referring now to FIGS. 1 and 9, operations for establishing protocol caches 38, 44 at the first 20 and second 30 computers (block 100 of FIG. 6 and block 114 of FIG. 7, respectively) will be described with further detail for start-up according to an embodiment of the present invention. For the embodiment illustrated in FIG. 9, the application executing on the first computer is a client protocol conversion application 40 and the application executing on the second computer is a server protocol conversion application 46. At block 130 the client protocol conversion application 40 initiates a communication session by transmitting a request to the server protocol conversion application 40 over the external communication link 34. At block 132, the server protocol conversion application 46 transmits the checkpoint identifier of the checkpoint cache of the second computer to the client protocol conversion application 40. A checkpoint cache of the first computer 20 corresponding to the transmitted checkpoint identifier from the second computer 30 is selected as the protocol cache 38 operatively associated with the first computer for use with the initiated communication session at block 134. At block 136, an acknowledgment message is transmitted to the server protocol conversion application 46 acknowledging selection of the checkpoint cache corresponding to the checkpoint identifier as the protocol cache for use with the initiated communication session. On receipt of the confirmation at block 138, the server protocol conversion application 46 selects the checkpoint cache of the second computer associated with the checkpoint identifier as the corresponding protocol cache 44 operatively associated with the second computer 30. Accordingly, upon completion of the operations of block 138, both the first computer 20 and the second computer 30 have established synchronized protocol caches 38, 44 for use in improving communications over external communication link 34, for example by utilizing data differencing as described previously. The communication session then begins at block 140 allowing communications between host application 42 and terminal application 36 to proceed and obtain the benefits of the data stream differencing aspects of the present invention.

In an alternative embodiment of the operations for establishing protocol caches 38, 44 at the first 20 and second 30 computers operations at block 130 include transmitting a request to initiate a session which includes an identification of a checkpoint cache available at first computer 20. In this embodiment, second computer 30 selects a checkpoint cache of the second computer corresponding to the transmitted identification for use with the initiated communication session. Second computer 30 transmits an acknowledgment message to first computer 20 confirming the selection of a checkpoint cache corresponding to the identification as the active protocol cache for the new communication session. Responsive to receipt of the acknowledgment message, first computer 20 selects the checkpoint cache identified in its request to initiate a session as the active protocol cache for the new session. Communications for the new session then commence as indicated at block 140.

While operations in connection with FIG. 9 have been described with respect to a single checkpoint cache of the second computer, it is to be understood that two or even more checkpoint caches may be provided at the second computer or the first computer. Where a plurality of checkpoint caches are provided, at block 132 the checkpoint identifier of each of the plurality of checkpoint caches associated with the second computer is transmitted. Similarly, at block 134, the client protocol conversion application 40 selects a checkpoint cache of the first computer corresponding to one of the transmitted checkpoint identifiers as the protocol cache 38 operatively associated with the first computer 20 for use with the initiated communication session. At block 136 the identifier of the selected one of the checkpoint caches is returned to the second computer 30 and at block 138, the checkpoint cache of the second computer corresponding to the checkpoint identifier transmitted at block 136 is selected as the corresponding protocol cache 44 operatively associated with the second computer 30 for use with the initiated communication session. Similarly, a plurality of identifiers may be communicated for the alternate embodiment described above.

Operations related to determining if a new checkpoint is desired as described previously with respect to block 102 of FIG. 6 will now be described in more detail with respect to a particular embodiment of the present invention by reference to FIGS. 1 and 10. Operations begin in FIG. 10 at block 142 with completion of the operations for taking a checkpoint as previously described with respect to FIGS. 6–8 (or at session start-up for a new session which has not yet generated a first checkpoint). At block 144, the first computer 20, which initiated the checkpoint, determines if an error has occurred in copying the protocol cache 44 of the second computer to a checkpoint cache (or if any other error causing checkpoint operations to be deemed unreliable occurred) as described with respect to block 118 of FIG. 7. If an error is detected at block 144, operations return to block 142 and a new checkpoint is taken. If no error is detected at block 144, the first computer 20 determines if a predetermined period of time has passed since the checkpoint has been taken at block 146. If the predetermined period of time has passed, the timer is reset at block 148, and at block 150, if there has been activity on the communication session during the time out period operations are return to block 142 to take a new checkpoint. As further indicated at block 150, if there has been no or minimal communication activity during the time out period, operations return to block 146 until the predetermined time period again expires.

Figure 10:
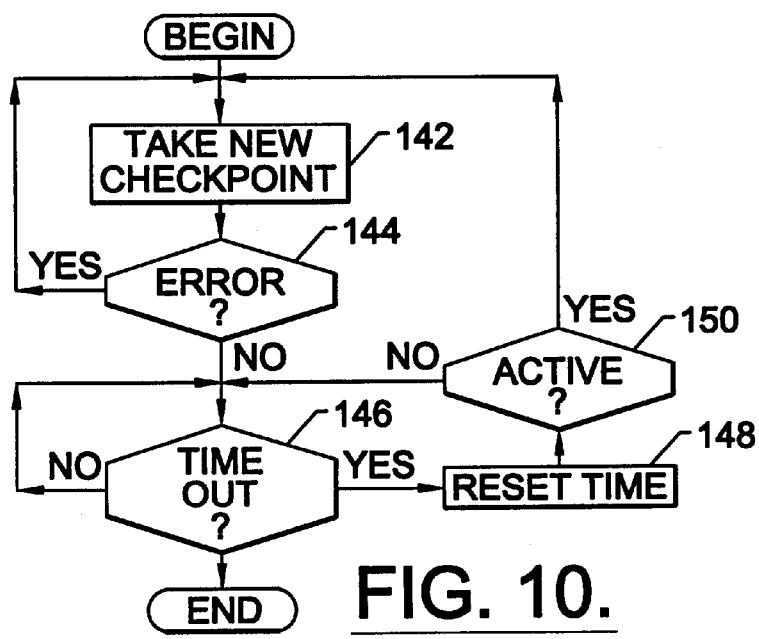
FIG. 10 is a flow diagram depicting operations for determining if a new checkpoint is desired according to an embodiment of the present invention.

For the exemplary operations for initiating a new checkpoint described with respect to FIG. 10, the checkpoint may be taken after a predetermined time period since the last checkpoint (or start up) assuming that at least some amount of updates to the protocol caches 38, 44 have occurred since the last checkpoint. By using both time and communications activity as criteria, needless checkpoints will not be taken during prolonged user think time where the active protocol cache 38, 44 have not changed. Preferably, the time out period for initiating a new checkpoint should be chosen as large relative to the time required to perform the checkpoint at both the first and the second computer. The predetermined period may also vary, for example, random variations between a maximum and minimum period. Furthermore, initiation of a new checkpoint when an error is detected as indicated at block 144 may be unnecessary since checkpoint cache copies are intended to improve performance when new sessions are started, making it acceptable to simply ignore failed checkpoints and wait for the next time out at block 146.

Multiple Sessions Between A Single Client/Server Pair

Communication sessions between a terminal application 36 and a host application 42 are transient objects which may be discontinued or interrupted and later restarted. Therefore, the present invention provides for an association of a protocol cache pair to the correct session between a given host application 42 and terminal application 36 with minimal configuration burden. In the simplest case, this association is provided by tagging each of the cache pair at first computer 20 and second computer 30 respectively with the IP addresses or names of the respective computers. This approach is not available, however, in two cases: 1) when IP addresses are dynamically assigned (as is often the case with service providers); and 2) when a terminal wishes to have multiple sessions with the same host. In the latter case, as will be described herein, each active communication session is provided its own active protocol cache pair to maintain session synchronization.

In the simple case, a single session using IP addresses which are not dynamically assigned, cache identification is preferably provided by using the terminal (or client) IP address to name a directory level under which all nontemporary cache instances that apply to sessions for that client are stored. Where IP addresses are dynamically assigned, in one embodiment of the present invention, client protocol conversion (interceptor) application 40 implements an identification assignment capability that is processed during initial capability negotiations with server protocol conversion (interceptor) application 46. When client application 40 contacts server application 46, client application 40 looks for an identification file (stored locally). If such a file exists, client application 40 reads the file, extracts the identification and forwards it to server application 46. Server application 46 uses this identification as a directory name for storing the cache files that pertain to sessions started from the connected client application 40.

If an identification does not exist, client application 40 sends a null identification to server application 46. On receipt of a non-null ID, server application 46 tries to locate the directory (or subdirectory) level that matches. If found, server application 46 returns the relevant checkpoint information so that client application 40 can open its corresponding half of the protocol cache pair to be used during the session. If a null ID or a non-null ID that is invalid is received by server application 46, it generates a new identifier, creates a corresponding directory for saving cache files, and returns the identifier to client application 40 with no checkpoint data, thereby indicating that processing will commence with an empty cache (cold start). If client application 40 receives a new identifier, it saves the new identifier, creates a new directory and deletes all files associated with the previous identifier if there was one. Once an identifier is established, it may persist indefinitely as long as the associated client application 40 is defined to connect to the given server application 46.

Where multiple sessions are active concurrently between the same client application 40 and server application 46, the checkpoint protocol as described above is preferably modified as will now be described.

One of the tasks for client application 40 and server application 46 during session start up is to identify a proper checkpoint cache instance for commencement of the new session being started. This is not a problem where there is only a single session between client application 40 and server application 46 based on the availability of permanent persistent network identifiers (i.e., IP names and addresses, permanently assigned port numbers) that may be used to tag a cache instance to a unique client/server pair as described above. Where multiple sessions between a single client and server are provided, and sessions are terminated, and new sessions are later started between the same client and server, it is desirable to determine what cache pair information is appropriate for use with the new session. As session identifiers are transient, the present invention tracks newly created checkpoints to allow "hot" or "warm" start up, rather than cold start on new sessions. The methods, systems and program products of the present invention further provide for handling race conditions where multiple sessions attempt to create checkpoints concurrently.

In one embodiment of the present invention, multiple sessions between the same client/server pair (or terminal emulator application/host application pair) use a shared checkpoint cache. This shared checkpoint cache is treated as useful for any session created between the same client/server pair in the future. The shared checkpoint may be made by any one of the concurrently operating sessions without regard to whether that session was the one that made the last checkpoint. Operations unique to the multiple session aspects of the present invention will now be further described with reference to FIG. 11. For the embodiment illustrated in FIG. 11, at least one checkpoint slot is provided on the client side and at least two slots are provided on the server side. When a checkpoint is in progress for one session, other sessions are courteous. In other words, if another session is signaled to take a checkpoint and it detects that a checkpoint is in progress, it simply ignores the checkpoint request and continues. Providing two checkpoint slots on the server side allows a confirmed cache for start up even if a random failure occurred during the last checkpoint protocol, as the previous checkpoint which, as described previously would have a corresponding confirmed checkpoint on the client side, would still be available on the server side.

Figure 11:
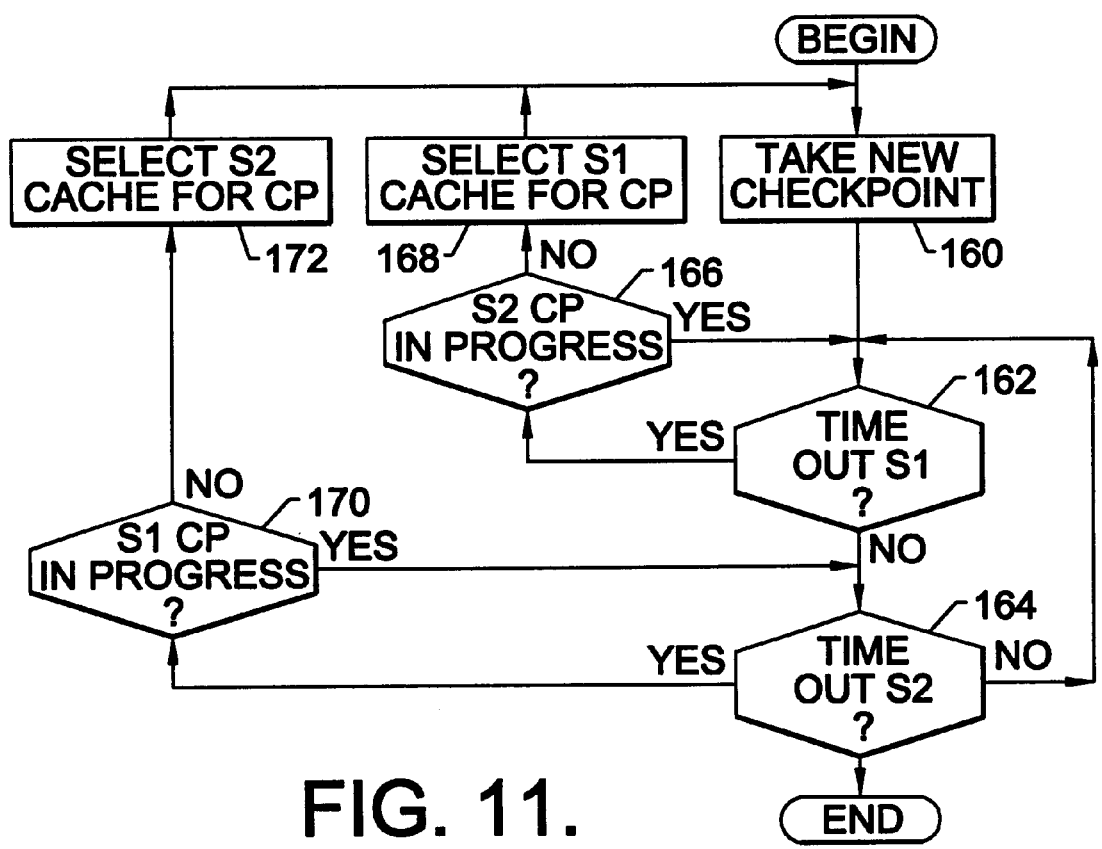
FIG. 11 is a flow diagram depicting operations for determining if a new checkpoint is desired and for selecting a session to use in generating a checkpoint according to an embodiment of the present invention having multiple concurrent sessions between a single client/server pair.

Referring now to FIGS. 1 and 11, operations for checkpointing with multiple communication sessions between the same client/server pair begin at block 160 with a checkpoint being taken from the active protocol cache 38, 44 of one of the sessions. For purposes of the description and as illustrated in the embodiment of FIG. 11, only two sessions are shown. However, it is to be understood that the benefits of the present invention may also be provided with a larger number of sessions between the same client/server pair. While operations in establishing a protocol cache for each of the sessions will not be further described, it is also to be understood that, for the case of multiple sessions, each of the sessions establishes an active protocol cache and updates it as described previously in connection with FIGS. 2–5 for the terminal emulator data stream differencing system aspects of the present invention. Likewise, checkpoint initiation operations for each active session proceed as described with respect to FIG. 10, except for the aspects related to multiple session checkpointing illustrated in FIG. 11.

Referring now to FIGS. 1 and 11, at block 162 in the illustrated embodiment of FIG. 11, client application 40 determines if session 1 (the first session) has timed out (i.e., if a predetermined time has passed since a checkpoint was taken for session 1). If session 1's checkpoint procedure has not timed out, at block 164 client application 40 determines if the predetermined time out period since a checkpoint was last taken for session 2 (the concurrent second session) has expired. If no time out has occurred at block 162 or block 164, no checkpoint is taken and operations continue to monitor each session timer until they indicate the need to take a new checkpoint.

If a time out is indicated for session 1 at block 162, client application 40 determines at block 166 if a checkpoint for session 2 is currently in progress. If it is, no checkpoint is initiated for session 1 and operations return to watching for a time out at block 162. The timer for session 1 may be reset or, alternatively, set to some different value to provide for preferential selection of a checkpoint based on session 1 the next time a checkpoint is taken at block 160. If no session 2 checkpoint is in progress at block 166, then the protocol cache associated with session 1 is selected for checkpointing at block 168 and a new checkpoint is taken at block 160. Operations for taking a new checkpoint at block 160 proceed as described for the various embodiments at FIGS. 6–9 and will not be described further herein. If a time out for session 2 is indicated at block 164, client application 40 determines if a checkpoint is in progress from session 1 at block 170 and, if no session is in progress, at block 172 the session 2 protocol cache is selected for the checkpoint.

While communications activity level and checkpoint error detection aspects of the selection of timing for a new checkpoint have not been described in connection with FIG. 11, it is to be understood that these additional criteria could be provided for a multiple session checkpointing as described previously in connection with blocks 144 and 150 of FIG. 10.

As described with respect to FIG. 11, each of the concurrent active sessions between the same client/server pair share a common checkpoint cache. Accordingly, operations for initiation of "hot" start up of a subsequent new session between the same client/server pair proceed as described previously with respect to FIG. 9, regardless of whether the new session is a restart of session 1 or session 2. Furthermore, by providing for an intermixing of checkpoint cache updates from both session 1's and session 2's active protocol caches over the course of a plurality of checkpoint operations during a sequence of ongoing communication sessions, the checkpoint cache eventually contains information related to both sessions, thereby increasing the likelihood that on each subsequent start up using the common checkpoint cache for a new session will provide improved performance, regardless of whether the new session is a restart of session 1 or session 2 (or any number of sessions which have occurred over time). In other words, as restarts occur over time information from prior sessions is merged with information from new sessions as the checkpoint cache used initially in the new session is based on the prior sessions.

In the drawings and specification, there have been disclosed typical preferred embodiments of the invention and, although specific terms are employed, these terms are used in a generic and descriptive sense only and not for purposes of limitation, the scope of the invention being set forth in the following claims:

That which is claimed is:

1. A method of persistent cache synchronization for a first communication session and a concurrent second communication session over an external communication link between an application executing on a first computer and an application executing on a second computer located remote from the first computer, the method comprising the steps of:

determining if a new checkpoint is required;

establishing a first cache operatively associated with the first session at the first computer and a corresponding second cache operatively associated with the first session at the second computer;

establishing a third cache operatively associated with the second session at the first computer and a corresponding fourth cache operatively associated with the second session at the second computer;

transmitting a checkpoint request to the second computer indicating one of the first or the third cache to be used to provide a checkpoint;

receiving the checkpoint request at the second computer;

copying the second cache responsive to the received checkpoint request if the checkpoint request indicates the first cache to provide a checkpoint cache of the second computer;

copying the fourth cache responsive to the received checkpoint request if the checkpoint request indicates the third cache to provide a checkpoint cache of the second computer;

associating the checkpoint cache of the second computer with both the first and the second session;

transmitting a checkpoint confirmation message to the first computer responsive to said step of copying the second cache and said step of copying the fourth cache;

receiving the checkpoint confirmation message at the first computer;

creating a checkpoint cache of the first computer as a copy of the indicated one of the first or the third cache responsive to the received checkpoint confirmation message;

associating the checkpoint cache of the first computer with both the first session and the second session to provide a checkpoint; and then repeating, responsive to said determining step, said steps of transmitting a checkpoint request, receiving the checkpoint request, copying the second cache, copying the fourth cache, associating the checkpoint cache of the second computer, transmitting a checkpoint confirmation message, receiving the checkpoint confirmation message, creating, and associating the checkpoint cache of the first computer to provide a new checkpoint;

wherein said determining step comprises the steps of:
initiating a new checkpoint from the first cache based on a checkpoint criteria for the first session;
preventing initiating a new checkpoint from the first cache during execution of said repeating step wherein the one of the first or the third cache is the third cache;
initiating a new checkpoint from the third cache based on a checkpoint criteria for the second session; and
preventing initiating a new checkpoint from the third cache during execution of said repeating step wherein the one of the first or the third cache is the first cache.

2. A method according to claim 1 wherein the checkpoint criteria for the first session is the same as the checkpoint criteria for the second session.

3. A method according to claim 1 wherein the checkpoint criteria for the first session is a function of the time since a checkpoint was last taken from the first cache and the checkpoint criteria for the second session is a function of the time since a checkpoint was last taken from the third cache.

4. A method according to claim 1 wherein the checkpoint criteria for the first session is a function of communications activity associated with the first session and the checkpoint criteria for the second session is a function of communications activity associated with the second session.

5. A method according to claim 1 wherein the checkpoint criteria for the first session and the checkpoint criteria for the second session are selected to result in a checkpoint cache after a plurality of checkpoints have been executed which is taken from both the first cache and the third cache.

6. A method according to claim 1 wherein the application executing on the first computer is a client protocol conversion application and wherein the application executing on the second computer is a server protocol conversion application and wherein the determining step is performed at the first computer.

7. A method according to claim 6 further comprising the steps following said converting step of:
initiating a third communication session by transmitting a request from the client application to the server application over the external communication link;
transmitting an identification of the checkpoint cache of the second computer to the client application;
selecting a checkpoint cache of the first computer associated with the transmitted identification as a protocol cache operatively associated with the third session at the first computer;
transmitting an acknowledgment message to the server application acknowledging selection of the identified checkpoint cache as the protocol cache for use with the third session at the first computer;
selecting the identified checkpoint cache of the second computer as a corresponding protocol cache operatively associated with the third session at the second computer.

8. A method according to claim 7 wherein a plurality of checkpoint caches are associated with the second computer; and
wherein said step of transmitting an identification comprises the step of transmitting an identification of each of the plurality of checkpoint caches associated with the second computer; and wherein said step of selecting a checkpoint cache of the first computer comprises the step of selecting a checkpoint cache of the first computer associated with one of the transmitted identifications as the protocol cache operatively associated with the third session at the first computer; and wherein said transmitting an acknowledgment step comprises the step of transmitting an acknowledgment message to the server application including an indication of the one of the transmitted identifications associated with the selected checkpoint cache operatively associated with the third session at the first computer; and wherein said selecting the identified cache of the second computer step comprises the step of selecting the indicated checkpoint cache of the second computer as the corresponding protocol cache operatively associated with the third session at the second computer.

9. A method according to claim 1 wherein said step of transmitting a checkpoint confirmation message comprises the steps of:
determining if the checkpoint cache of the second computer was provided without error by said one of said step of copying the second cache or said step of copying the fourth cache; and
transmitting a checkpoint confirmation message indicating a success if no error is indicated by said step of determining if the checkpoint cache of the second computer was provided without error.

10. A method according to claim 4 further comprising the step preceding said transmitting a checkpoint request of:
copying one of the first or the third cache at the first computer to a temporary cache of the first computer; and
wherein said step of transmitting a checkpoint confirmation message further comprises the step of transmitting a checkpoint confirmation message indicating a failure if an error is indicated by said step of determining if the checkpoint cache of the second computer was provided without error; and
wherein said step of receiving the checkpoint confirmation message includes the step of determining if the received checkpoint confirmation message indicates a success; and
wherein said creating step comprises the steps of:
converting the temporary cache into a checkpoint cache of the first computer if the received checkpoint confirmation message indicates a success; and
discarding the temporary cache if the received checkpoint confirmation message indicates a failure.

11. A method according to claim 1 further comprising the steps following said creating step of:
initiating a third communication session by transmitting a request including an identification of the checkpoint cache of the first computer from the first computer to the second computer over the external communication link;
selecting a checkpoint cache of the second computer corresponding to the transmitted identification as a corresponding protocol cache operatively associated with the third session at the second computer;
transmitting an acknowledgment message to the first computer acknowledging selection of the checkpoint cache of the second computer corresponding to the transmitted identification as the corresponding protocol cache operatively associated with the third session at the second computer; and selecting the checkpoint cache of the first computer as a protocol cache operatively associated with the third session at the first computer.

12. A method of persistent cache synchronization for an application executing on a second computer and having a first communication session and a concurrent second communication session over an external communication link with an application executing on a first computer and located remote from the second computer, the method comprising the steps of:

establishing a protocol cache operatively associated with the first session at the second computer;

establishing a protocol cache operatively associated with the second session at the second computer;

receiving at the second computer a checkpoint request identifying one of the first or the second session;

copying the protocol cache operatively associated with the identified one of the first or the second session at the second computer responsive to the received checkpoint request to provide a checkpoint cache of the second computer, the checkpoint cache of the second computer being associated with both the first and the second session;

transmitting a checkpoint confirmation message to the first computer responsive to said step of copying the protocol cache; and then repeating said steps of receiving copying and transmitting to provide a new checkpoint;

wherein the application executing on the first computer is a client protocol conversion application and wherein the application executing on the second computer is a server protocol conversion application and further comprising the steps following said transmitting step of:

receiving a request to initiate a new session including an identification of a checkpoint cache of the first computer from the first computer at the second computer over the external communication link;

selecting a checkpoint cache of the second computer corresponding to the transmitted identification as a corresponding protocol cache operatively associated with the third session at the second computer; and transmitting an acknowledgment message to the first computer acknowledging selection of the checkpoint cache of the second computer corresponding to the transmitted identification as the corresponding protocol cache operatively associated with the third session at the second computer.

13. A method of persistent cache synchronization for an application executing on a first computer and having a first communication session and a concurrent second communication session over an external communication link with an application executing on a second computer located remote from the first computer, the method comprising the steps of:

establishing a protocol cache operatively associated with the first session at the first computer;

establishing a protocol cache operatively associated with the second session at the first computer;

transmitting a checkpoint request to the second computer indicating one of the first or the second session whose associated protocol cache is to be used to create a checkpoint;

receiving a checkpoint confirmation message at the first computer;

creating a checkpoint cache of the first computer as a copy of the protocol cache of the one of the first or the second session at the first computer responsive to the received checkpoint confirmation message to provide a checkpoint, the checkpoint cache of the first computer being associated with both the first session and the second session; and then repeating said steps of transmitting receiving and creating to provide a new checkpoint;

wherein the application executing on the first computer is a client protocol conversion application and wherein the application executing on the second computer is a server protocol conversion application and further comprising the steps following said creating step of:

initiating a third communication session by transmitting a request including an identification of the checkpoint cache of the first computer from the first computer to the second computer over the external communication link;

receiving an acknowledgment message at the first computer acknowledging selection of a checkpoint cache of the second computer corresponding to the transmitted identification as a corresponding protocol cache operatively associated with the third session at the second computer; and selecting the checkpoint cache of the first computer as a protocol cache operatively associated with the third session at the first computer.

14. A system for persistent cache synchronization for a first communication session and a concurrent second communication session over an external communication link between an application executing on a first computer and an application executing on a second computer located remote from the first computer, the system comprising:

means operatively associated with the first computer for establishing a first cache operatively associated with the first session at the first computer and a third cache operatively associated with the second session at the first computer;

means operatively associated with the second computer for establishing a corresponding second cache operatively associated with the first session at the second computer and a corresponding fourth cache operatively associated with the second session at the second computer;

means operatively associated with said first computer for determining if a new checkpoint is desired;

means responsive to said means for determining for transmitting a checkpoint request to the second computer indicating one of the first or the third cache to be used to provide a checkpoint;

means for receiving the checkpoint request at the second computer;

means for copying the second cache responsive to the received checkpoint request if the checkpoint request indicates the first cache to provide a checkpoint cache of the second computer;

means for copying the fourth cache responsive to the received checkpoint request if the checkpoint request indicates the third cache to provide a checkpoint cache of the second computer;

means for associating the checkpoint cache of the second computer with both the first and the second session;

means for transmitting a checkpoint confirmation message to the first computer responsive to said means for copying the second cache and said means for copying the fourth cache;

means for receiving a checkpoint confirmation message at the first computer;

means for creating a checkpoint cache of the first computer as a copy of the indicated one of the first or the third cache responsive to a received checkpoint confirmation message; and means for associating the checkpoint cache of the first computer with both the first session and the second session to provide a checkpoint;

wherein said means for determining comprises:
 means for initiating a new checkpoint from the first cache based on a checkpoint criteria for the first session;
 means for initiating a new checkpoint from the third cache based on a checkpoint criteria for the second session; and
 means for preventing said means for initiating a new checkpoint from the first cache and said means for initiating a checkpoint from the third cache from initiating interfering new checkpoints.

15. A system according to claim 14 wherein the checkpoint criteria for the first session is the same as the checkpoint criteria for the second session.

16. A system according to claim 14 wherein the checkpoint criteria for the first session is a function of the time since a checkpoint was last taken from the first cache and the checkpoint criteria for the second session is a function of the time since a checkpoint was last taken from the third cache.

17. A system according to claim 14 wherein the checkpoint criteria for the first session is a function of communications activity associated with the first session and the checkpoint criteria for the second session is a function of communications activity associated with the second session.

18. A system according to claim 14 wherein the checkpoint criteria for the first session and the checkpoint criteria for the second session are selected to result in a checkpoint cache after a plurality of checkpoints have been initiated which is taken from both the first cache and the third cache.

19. A system according to claim 14 wherein the application executing on the first computer is a client protocol conversion application and wherein the application executing on the second computer is a server protocol conversion application.

20. A system according to claim 19 further comprising:
 means for initiating a third communication session by transmitting a request from the client application to the server application over the external communication link;
 means responsive to said means for initiating a third communication session for transmitting an identification of the checkpoint cache of the second computer to the client application;
 means for selecting a checkpoint cache of the first computer associated with the transmitted identification as a protocol cache operatively associated with the third session at the first computer;
 means for transmitting an acknowledgment message to the server application acknowledging selection of the identified checkpoint cache as the protocol cache for use with the third session at the first computer; and
 means for selecting the identified checkpoint cache of the second computer as a corresponding protocol cache operatively associated with the third session at the second computer.

21. A system according to claim 20 wherein a plurality of checkpoint caches are associated with the second computer; and
 wherein said means for transmitting an identification comprises means for transmitting an identification of each of the plurality of checkpoint caches associated with the second computer; and
 wherein said means for selecting a checkpoint cache of the first computer comprises means for selecting a checkpoint cache of the first computer associated with one of the transmitted identifications as the protocol cache operatively associated with the third session at the first computer; and
 wherein said means for transmitting an acknowledgment comprises means for transmitting an acknowledgment message to the server application including an indication of the one of the transmitted identifications associated with the selected checkpoint cache operatively associated with the third session at the first computer; and
 wherein said means for selecting the identified cache of the second computer comprises means for selecting the indicated checkpoint cache of the second computer as the corresponding protocol cache operatively associated with the third session at the second computer.

22. A system according to claim 14 wherein said means for transmitting a checkpoint confirmation message comprises:
 means for determining if a checkpoint cache of the second computer was provided without error by said means for copying the second cache or said means for copying the fourth cache; and
 means for transmitting a checkpoint confirmation message indicating a success if no error is indicated by said means for determining if a checkpoint cache of the second computer was provided without error.

23. A system according to claim 22 further comprising:
 means for copying one of the first or the third cache at the first computer to a temporary cache of the first computer; and
 wherein said means for transmitting a checkpoint confirmation message further comprises means for transmitting a checkpoint confirmation message indicating a failure if an error is indicated by said means for determining if a checkpoint cache of the second computer was provided without error; and
 wherein said means for receiving a checkpoint confirmation message comprises means for determining if the received checkpoint confirmation message indicates a success; and
 wherein said means for creating comprises:
 means for converting the temporary cache into a checkpoint cache of the first computer if the received checkpoint confirmation message indicates a success; and
 means for discarding the temporary cache if the received checkpoint confirmation message indicates a failure.

24. A system according to claim 14 further comprising:
 means for initiating a third communication session by transmitting a request including an identification of the checkpoint cache of the first computer from the first computer to the second computer over the external communication link;
 means for selecting a checkpoint cache of the second computer corresponding to the transmitted identification as a corresponding protocol cache operatively associated with the third session at the second computer;

means for transmitting an acknowledgment message to the first computer acknowledging selection of the checkpoint cache of the second computer corresponding to the transmitted identification as the corresponding protocol cache operatively associated with the third session at the second computer; and means for selecting the checkpoint cache of the first computer as a protocol cache operatively associated with the third session at the first computer.

25. A system for persistent cache synchronization for an application executing on a second computer and having a first communication session and a concurrent second communication session over an external communication link with an application executing on a first computer and located remote from the second computer, the system comprising:

means for establishing a protocol cache operatively associated with the first session at the second computer;

means for establishing a protocol cache operatively associated with the second session at the second computer;

means at the second computer for receiving a checkpoint request identifying one of the first or the second session;

means for copying the protocol cache operatively associated with the identified one of the first or the second session at the second computer responsive to the received checkpoint request to provide a checkpoint cache of the second computer, the checkpoint cache of the second computer being associated with both the first and the second session; and means for transmitting a checkpoint confirmation message to the first computer responsive to said means for copying the protocol cache;

wherein the application executing on the first computer is a client protocol conversion application and wherein the application executing on the second computer is a server protocol conversion application and further comprising:

means at the second computer for receiving a request to initiate a new session including an identification of a checkpoint cache of the first computer from the first computer over the external communication link;

means for selecting a checkpoint cache of the second computer corresponding to the transmitted identification as a corresponding protocol cache operatively associated with the third session at the second computer; and means for transmitting an acknowledgment message to the first computer acknowledging selection of the checkpoint cache of the second computer corresponding to the transmitted identification as the corresponding protocol cache operatively associated with the third session at the second computer.

26. A system for persistent cache synchronization for an application executing on a first computer and having a first communication session and a concurrent second communication session over an external communication link with an application executing on a second computer located remote from the first computer, the system comprising:

means for establishing a protocol cache operatively associated with the first session at the first computer;

means for establishing a protocol cache operatively associated with the second session at the first computer;

means at the first computer for determining if a new checkpoint is desired;

means responsive to said means for determining if a new checkpoint is desired for transmitting a checkpoint request to the second computer indicating one of the first or the second session whose associated protocol cache is to be used to create a checkpoint;

means for receiving a checkpoint confirmation message at the first computer; and means for creating a checkpoint cache of the first computer as a copy of the protocol cache of the one of the first or the second session at the first computer responsive to the received checkpoint confirmation message to provide a checkpoint, the checkpoint cache of the first computer being associated with both the first session and the second session;

wherein the application executing on the first computer is a client protocol conversion application and wherein the application executing on the second computer is a server protocol conversion application and further comprising:

means for initiating a third communication session by transmitting a request including an identification of the checkpoint cache of the first computer from the first computer to the second computer over the external communication link;

means for receiving an acknowledgment message at the first computer acknowledging selection of a checkpoint cache of the second computer corresponding to the transmitted identification as a corresponding protocol cache operatively associated with the third session at the second computer; and means for selecting the checkpoint cache of the first computer as a protocol cache operatively associated with the third session at the first computer.

27. A computer program product for persistent cache synchronization for a first communication session and a concurrent second communication session over an external communication link between an application executing on a first computer and an application executing on a second computer located remote from the first computer, the computer program product comprising:

a computer readable storage medium having computer readable program code means embodied in said medium, said computer readable program code means comprising:

computer readable program code means operatively associated with the first computer for establishing a first cache operatively associated with the first session at the first computer and a third cache operatively associated with the second session at the first computer;

computer readable program code means operatively associated with the second computer for establishing a corresponding second cache operatively associated with the first session at the second computer and a corresponding fourth cache operatively associated with the second session at the second computer;

computer readable program code means operatively associated with said first computer for determining if a new checkpoint is desired;

computer readable program code means responsive to said computer readable program code means for determining for transmitting a checkpoint request to the second computer indicating one of the first or the third cache to be used to provide a checkpoint;

computer readable program code means for receiving the checkpoint request at the second computer;

computer readable program code means for copying the second cache responsive to the received checkpoint request if the checkpoint request indicates the first cache to provide a checkpoint cache of the second computer;

computer readable program code means for copying the fourth cache responsive to the received checkpoint request if the checkpoint request indicates the third cache to provide a checkpoint cache of the second computer;

computer readable program code means for associating the checkpoint cache of the second computer with both the first and the second session;

computer readable program code means for transmitting a checkpoint confirmation message to the first computer responsive to said computer readable program code means for copying the second cache and said computer readable program code means for copying the fourth cache;

computer readable program code means for receiving a checkpoint confirmation message at the first computer;

computer readable program code means for creating a checkpoint cache of the first computer as a copy of the indicated one of the first or the third cache responsive to a received checkpoint confirmation message; and computer readable program code means for associating the checkpoint cache of the first computer with both the first session and the second session to provide a checkpoint;

wherein said computer readable program code means for determining comprises:

computer readable program code means for initiating a new checkpoint from the first cache based on a checkpoint criteria for the first session;

computer readable program code means for initiating a new checkpoint from the third cache based on a checkpoint criteria for the second session; and computer readable program code means for preventing said computer readable program code means for initiating a new checkpoint from the first cache and said computer readable program code means for initiating a checkpoint from the third cache from initiating interfering new checkpoints.

28. A computer program product according to claim 27 wherein the checkpoint criteria for the first session is the same as the checkpoint criteria for the second session.

29. A computer program product according to claim 27 wherein the checkpoint criteria for the first session is a function of the time since a checkpoint was last taken from the first cache and the checkpoint criteria for the second session is a function of the time since a checkpoint was last taken from the third cache.

30. A computer program product according to claim 27 wherein the checkpoint criteria for the first session is a function of communications activity associated with the first session and the checkpoint criteria for the second session is a function of communications activity associated with the second session.

31. A computer program product according to claim 27 wherein the checkpoint criteria for the first session and the checkpoint criteria for the second session are selected to result in a checkpoint cache after a plurality of checkpoints have been initiated which is taken from both the first cache and the third cache.

32. A computer program product according to claim 27 wherein the application executing on the first computer is a client protocol conversion application and wherein the application executing on the second computer is a server protocol conversion application.

33. A computer program product according to claim 32 further comprising:

computer readable program code means for initiating a third communication session by transmitting a request from the client application to the server application over the external communication link;

computer readable program code means responsive to said computer readable program code means for initiating a third communication session for transmitting an identification of the checkpoint cache of the second computer to the client application;

computer readable program code means for selecting a checkpoint cache of the first computer associated with the transmitted identification as a protocol cache operatively associated with the third session at the first computer;

computer readable program code means for transmitting an acknowledgment message to the server application acknowledging selection of the identified checkpoint cache as the protocol cache for use with the third session at the first computer; and computer readable program code means for selecting the identified checkpoint cache of the second computer as a corresponding protocol cache operatively associated with the third session at the second computer.

34. A computer program product according to claim 33 wherein a plurality of checkpoint caches are associated with the second computer; and wherein said computer readable program code means for transmitting an identification comprises computer readable program code means for transmitting an identification of each of the plurality of checkpoint caches associated with the second computer; and wherein said computer readable program code means for selecting a checkpoint cache of the first computer comprises computer readable program code means for selecting a checkpoint cache of the first computer associated with one of the transmitted identifications as the protocol cache operatively associated with the third session at the first computer; and wherein said computer readable program code means for transmitting an acknowledgment comprises computer readable program code means for transmitting an acknowledgment message to the server application including an indication of the one of the transmitted identifications associated with the selected checkpoint cache operatively associated with the third session at the first computer; and wherein said computer readable program code means for selecting the identified cache of the second computer comprises computer readable program code means for selecting the indicated checkpoint cache of the second computer as the corresponding protocol cache operatively associated with the third session at the second computer.

35. A computer program product according to claim 27 wherein said computer readable program code means for transmitting a checkpoint confirmation message comprises:

computer readable program code means for determining if a checkpoint cache of the second computer was provided without error by said computer readable program code means for copying the second cache or said computer readable program code means for copying the fourth cache; and computer readable program code means for transmitting a checkpoint confirmation message indicating a success if no error is indicated by said computer readable program code means for determining if a checkpoint cache of the second computer was provided without error.

36. A computer program product according to claim 9 further comprising:

computer readable program code means for copying one of the first or the third cache at the first computer to a temporary cache of the first computer; and wherein said computer readable program code means for transmitting a checkpoint confirmation message further comprises computer readable program code means for transmitting a checkpoint confirmation message indicating a failure if an error is indicated by said computer readable program code means for determining if a checkpoint cache of the second computer was provided without error; and wherein said computer readable program code means for receiving a checkpoint confirmation message comprises computer readable program code means for determining if the received checkpoint confirmation message indicates a success; and wherein said computer readable program code means for creating comprises:

computer readable program code means for converting the temporary cache into a checkpoint cache of the first computer if the received checkpoint confirmation message indicates a success; and computer readable program code means for discarding the temporary cache if the received checkpoint confirmation message indicates a failure.

37. A computer program product according to claim 27 further comprising:

computer readable program code means for initiating a third communication session by transmitting a request including an identification of the checkpoint cache of the first computer from the first computer to the second computer over the external communication link;

computer readable program code means for selecting a checkpoint cache of the second computer corresponding to the transmitted identification as a corresponding protocol cache operatively associated with the third session at the second computer;

computer readable program code means for transmitting an acknowledgment message to the first computer acknowledging selection of the checkpoint cache of the second computer corresponding to the transmitted identification as the corresponding protocol cache operatively associated with the third session at the second computer; and computer readable program code means for selecting the checkpoint cache of the first computer as a protocol cache operatively associated with the third session at the first computer.

38. A computer program product for persistent cache synchronization for an application executing on a second computer and having a first communication session and a concurrent second communication session over an external communication link with an application executing on a first computer and located remote from the second computer, the computer program product comprising:

a computer readable storage medium having computer readable program code means embodied in said medium, said computer readable program code means comprising:

computer readable program code means for establishing a protocol cache operatively associated with the first session at the second computer;

computer readable program code means for establishing a protocol cache operatively associated with the second session at the second computer;

computer readable program code means at the second computer for receiving a checkpoint request identifying one of the first or the second session;

computer readable program code means for copying the protocol cache operatively associated with the identified one of the first or the second session at the second computer responsive to the received checkpoint request to provide a checkpoint cache of the second computer, the checkpoint cache of the second computer being associated with both the first and the second session; and computer readable program code means for transmitting a checkpoint confirmation message to the first computer responsive to said computer readable program code means for copying the protocol cache;

wherein the application executing on the first computer is a client protocol conversion application and wherein the application executing on the second computer is a server protocol conversion application and further comprising:

computer readable program code means at the second computer for receiving a request to initiate a new session including an identification of a checkpoint cache of the first computer from the first computer over the external communication link;

computer readable program code means for selecting a checkpoint cache of the second computer corresponding to the transmitted identification as a corresponding protocol cache operatively associated with the third session at the second computer; and computer readable program code means for transmitting an acknowledgment message to the first computer acknowledging selection of the checkpoint cache of the second computer corresponding to the transmitted identification as the corresponding protocol cache operatively associated with the third session at the second computer.

39. A computer program product for persistent cache synchronization for an application executing on a first computer and having a first communication session and a concurrent second communication session over an external communication link with an application executing on a second computer located remote from the first computer, the computer program product comprising:

a computer readable storage medium having computer readable program code means embodied in said medium, said computer readable program code means comprising:

computer readable program code means for establishing a protocol cache operatively associated with the first session at the first computer;

computer readable program code means for establishing a protocol cache operatively associated with the second session at the first computer;

computer readable program code means at the first computer for determining if a new checkpoint is desired;

computer readable program code means responsive to said computer readable program code means for determining if a new checkpoint is desired for transmitting a checkpoint request to the second computer indicating one of the first or the second session whose associated protocol cache is to be used to create a checkpoint;

computer readable program code means for receiving a checkpoint confirmation message at the first computer; and computer readable program code means for creating a checkpoint cache of the first computer as a copy of the protocol cache of the one of the first or the second session at the first computer responsive to the received checkpoint confirmation message to provide a checkpoint, the checkpoint cache of the first computer being associated with both the first session and the second session;

wherein the application executing on the first computer is a client protocol conversion application and wherein the application executing on the second computer is a server protocol conversion application and further comprising:

computer readable program code means for initiating a third communication session by transmitting a request including an identification of the checkpoint cache of the first computer from the first computer to the second computer over the external communication link;

computer readable program code means for receiving an acknowledgment message at the first computer acknowledging selection of a checkpoint cache of the second computer corresponding to the transmitted identification as a corresponding protocol cache operatively associated with the third session at the second computer; and computer readable program code means for selecting the checkpoint cache of the first computer as a protocol cache operatively associated with the third session at the first computer.

* * * * *

UNITED STATES PATENT AND TRADEMARK OFFICE
CERTIFICATE OF CORRECTION

PATENT NO. : 5,907,678
DATED : May 25, 1999
INVENTOR(S) : Barron C. Housel, III; Ian Beaumont Shields It is certified that error appears in the above-identified patent and that said Letters Patent is hereby corrected as shown below:

On the title page item [56], under Attorney, Agent, please change the name "Sajoovec" to --Sajovec--;

In Claim 10, please change the dependency from "Claim 4" to --Claim 9--.

Signed and Sealed this

First Day of February, 2000

*Attest:*

Q. TODD DICKINSON

*Attesting Officer*     *Acting Commissioner of Patents and Trademarks*